United States Patent

Ito et al.

[11] Patent Number: 5,845,321
[45] Date of Patent: Dec. 1, 1998

[54] STORE BUFFER APPARATUS WITH TWO STORE BUFFERS TO INCREASE THROUGHPUT OF A STORE OPERATION

[75] Inventors: Motohisa Ito, Machida; Eiki Kamada; Toshiko Isobe, both of Hadano; Kei Yamamoto, Zama; Katsutoshi Uehara, Hadano, all of Japan

[73] Assignees: Hitachi, Ltd., Tokyo; Hitachi Information Technology Co, Ltd., Hadano, both of Japan

[21] Appl. No.: 729,837

[22] Filed: Oct. 15, 1996

[30] Foreign Application Priority Data

Oct. 16, 1995 [JP] Japan .................................. 7-266947

[51] Int. Cl.⁶ .............................. G06F 12/00; G06F 13/00
[52] U.S. Cl. ........................... 711/118; 711/100; 711/117; 711/122
[58] Field of Search .......................... 364/DIG. 1, 243.4, 364/243.41; 711/118, 117, 119, 122, 205, 206, 100

[56] References Cited

U.S. PATENT DOCUMENTS

| | | | |
|---|---|---|---|
| 4,195,340 | 3/1980 | Joyce | 395/875 |
| 4,424,562 | 1/1984 | Genna et al. | 395/875 |
| 4,467,414 | 8/1984 | Akagi et al. | 395/875 |
| 4,631,668 | 12/1986 | Kubo et al. | 395/875 |
| 5,426,749 | 6/1995 | Morioka | 395/400 |
| 5,510,973 | 4/1996 | Morioka | 364/134 |
| 5,544,340 | 8/1996 | Doi | 711/118 |
| 5,564,034 | 10/1996 | Miyake | 711/178 |
| 5,644,748 | 7/1997 | Utsunomiya et al. | 395/417 |
| 5,659,709 | 8/1997 | Quach | 711/146 |

Primary Examiner—Tod R. Swann
Assistant Examiner—Tuan V. Thai
Attorney, Agent, or Firm—Antonelli, Terry, Stout & Kraus, LLP

[57] ABSTRACT

A store buffer apparatus connected to a CPU and a main storage unit includes a first buffer for holding a pair of store address and store data in the main storage unit supplied from an operation execution unit of the CPU, a first latch connected to the first buffer means for holding the store address, a second latch connected to the first latch for holding an output of the first latch, a judgment device for comparing an output read out from the address array with an output of the second latch to thereby judge whether the cache hit check for the store address is successful or not and a second buffer for holding the pair of store data and store address having successful cache hit check judged by the judgment device. Occurrence of the state that the store buffer is full is reduced. Two data stored in the second buffer can possess a format into which the two data can be merged.

19 Claims, 22 Drawing Sheets

STORE BUFFER APPARATUS WITH TWO STORE BUFFERS TO INCREASE THROUGHPUT OF A STORE OPERATION

BACKGROUND OF THE INVENTION

The present invention relates to a store buffer apparatus including a cache memory and in which a store address and store data to be written into a main storage unit and the cache memory from an operation processing unit are stored.

When a store instruction is issued, data having successful cache hit check is written into a cache memory as a result of the cache hit check. In this conventional method, since a time for the cache hit check is required for each of a number of store instructions, an interval (pitch) between the store operations from an operation processing unit to the cache memory is made long, so that when the store instructions are continuously issued, the performance of a central processing unit (hereinafter referred to as a CPU) is degraded.

In order to solve this problem, U.S. Pat. No. 5,544,340 issued on Aug. 6, 1996 and which has been filed on Dec. 22, 1994 as a continuation application (U.S. patent application Ser. No. 08/362,755) based on 37 CFR 1.62 of U.S. patent application Ser. No. 07/709,277 entitled "METHOD OF CONTROLLING CACHE MEMORY DISPOSED BETWEEN CPU AND MAIN MEMORY" and filed by T. Doi et al. on Jun. 3, 1991 discloses that data is once written to be held in a store buffer without writing of the data into the cache memory and the processing is once finished by the writing into the store buffer, so that the CPU can move to processing of a next instruction without waiting until the data is actually written into the cache memory.

In the conventional method described above, an address of a store instruction which has been subjected to the cache hit check at the last time and its cache hit check result are stored. A subsequent store address is compared with the stored address and when both the addresses are coincident with each other, the stored result of the cache hit check is used without execution of the cache hit check. In this manner, the cache hit check is omitted to thereby shorten an interval or a pitch between the writing operations to the cache memory and improve the performance.

In the method described in the above paper, when data are stored in discontinuous addresses, a subsequent address is not coincident with the stored address and the stored result of the cache hit check may not be used. In this case, the cache hit check must be made again and the pitch between the writing operations described above is not improved. The cache hit check for the store instructions received successively is delayed, so that the store buffer is often full and there is the possibility that the store buffer does not function as a buffer. When such condition occurs, the CPU waits the execution until the full state of the store buffer is dissolved and accordingly there is a problem that the performance of the CPU is degraded. Further, there is also a problem that a bus connected to a main storage unit is not used effectively.

In addition, in the conventional method described above, since the cache hit check is made at the stage that a store address of a store instruction is outputted from the store buffer, a store instruction having unsuccessful cache hit check is also held in the store buffer and a plurality of entries in the store buffer are not used effectively.

SUMMARY OF THE INVENTION

It is an object of the present invention to provide a store buffer apparatus which reduces occurrence of the state that the store buffer is full to thereby prevent degradation of the performance of a CPU.

It is another object of the present invention to provide a store buffer apparatus in which the cache hit check is made before inputting of a store instruction to a store buffer so that only a store instruction having successful cache hit check is inputted into the store buffer to thereby improve the efficiency in use of the store buffer.

It is still another object of the present invention to provide a store buffer apparatus in which data for a plurality of entries of the store buffer are written in a cache memory at the same time to thereby improve the throughput of output.

It is a still further object of the present invention to provide a store buffer apparatus in which the cache hit check is made in the pipe line manner to thereby make a writing pitch to a main storage unit equal to a pitch for the cache hit check so that a bus connected to the main storage unit is used effectively.

A store buffer apparatus connected to a CPU and a main storage unit comprises:

first buffer means for holding a pair of store address and store data in the main storage unit supplied from an operation execution unit of the CPU;

a first latch connected to the first buffer means for holding the store address;

a second latch connected to the first latch for holding an output of the first latch;

judgment means for comparing an output read out from an address array with an output of the second latch to thereby judge whether the cache hit check for the store address is successful or not; and second buffer means for holding the pair of store data and store address having successful cache hit check judged by the judgment means.

While the judgment means receives the output of the second latch to make the cache hit check, the first latch holds a next store address of the above store address.

Two data stored in the second buffer means can have a format in which the two data are merged into one data. Occurrence of the state that a following-stage store buffer is full can be reduced. Further, the cache hit check is made upon inputting to the following-stage store buffer and only a store instruction having successful cache hit check is inputted into the following-stage store buffer, so that the efficiency in use of the following-stage store buffer can be improved. In addition, a plurality of entries in the following-stage store buffer can be outputted at the same time to thereby reduce occurrence of the state that the following-stage store buffer is full. Furthermore, the cache hit check can be made in the pipe line manner to thereby make the pitch for writing data into the main storage unit equal to the pitch for the cache hit check and use the bus connected to the main storage unit effectively.

DESCRIPTION OF THE PREFERRED EMBODIMENTS

An embodiment of the present invention is now described in detail with reference to the accompanying drawings.

Figure 1:
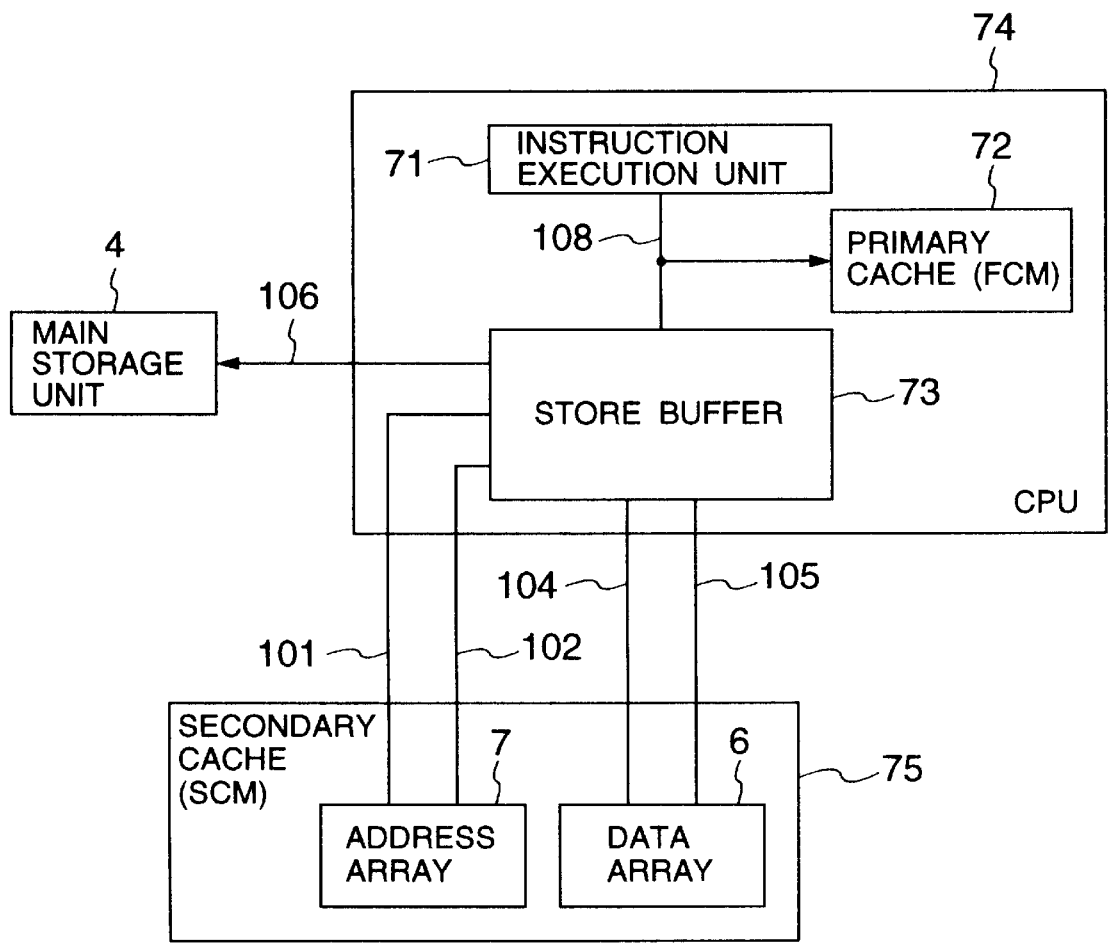
FIG. 1 is a schematic diagram illustrating an information processing apparatus in which the present invention is implemented.

In the following description, binary numbers are described between "and". FIG. 1 schematically illustrates an information processing apparatus in which the present invention is implemented. In FIG. 1, numeral 74 denotes a CPU, 75 a secondary cache memory of a store through type (hereinafter referred to as SCM), 4 a main storage unit, 71 an instruction execution unit for executing a program, 72 a higher-speed primary cache memory (hereinafter referred to as FCM) included in the CPU 74, 73 a store buffer, 6 a data array of the SCM, 7 an address array of the SCM, 108 a path for writing a store address and data, 106 a path for writing data into the main storage unit, 101 a path for transmitting an address referred to the SCM address array 7, 102 a path for transmitting contents of the SCM address array 7, 104 a path for transmitting a SCM store address, and 105 a path for transmitting SCM store data.

In the information processing apparatus, the cache memory is generally used in order to make memory access at a high speed. The FCM 72 provided in the CPU chip is operated at a high speed, while it is difficult to increase a memory capacity thereof due to limitation of a chip area. Accordingly, the SCM 75 is often provided outside of the CPU chip in addition to the FCM 72. The SCM 75 is inferior to the FCM 72 in respect to the operation speed but can increase a memory capacity thereof. FIG. 1 shows an example of the configuration where the SCM 75 is provided outside of the CPU 74. The SCM 75 includes the data array 6 and the address array 7. Data are written into the data array 6 and management information thereof is registered in the address array 7.

When data is read out from the main storage unit in response to a load instruction, the data and address are held in the FCM or the FCM and the SCM in the known manner.

In the execution of a store instruction, when the FCM hit check is successful, data is written into the FCM 72 and at the same time is written into the store buffer 73. The execution of the store instruction is finished at the stage that the data has been written in the store buffer 73 and the instruction execution unit 71 proceeds to processing of a next instruction. The store instruction held in the store buffer is written into the main storage unit 4 and the SCM 75 independent of operation of the instruction execution unit 71 when the SCM hit check is successful. However, when the SCM hit check is unsuccessful, it is not written into the SCM 75.

[EMBODIMENT 1]

Figure 2:
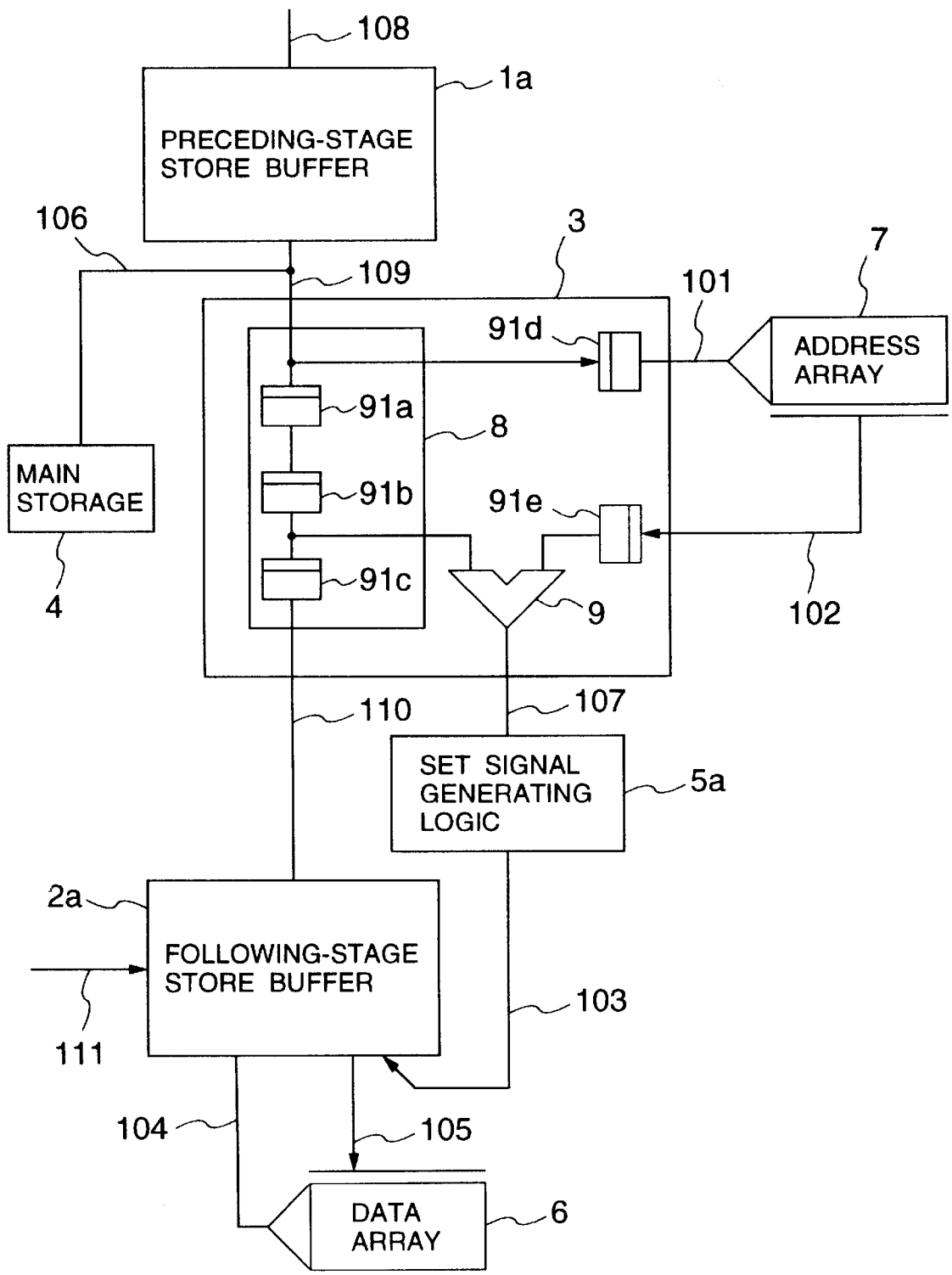
FIG. 2 is a schematic diagram illustrating an embodiment 1 of the present invention.

FIG. 2 is a schematic diagram illustrating an embodiment of the present invention and shows portion relative to writing of the store buffer, the SCM and the main storage unit. In FIG. 2, numeral 1a denotes a preceding-stage store buffer, 2 a following-stage store buffer, 3 an SCM hit check logic, 4 a main storage unit, 5a a set signal generating logic. In the present invention, the store buffer 73 of FIG. 1 is divided into the preceding-stage store buffer 1a and the following-stage store buffer 2a and the SCM hit check logic 3 is disposed between the preceding-stage store buffer 1a and the following-stage store buffer 2a.

The SCM hit check logic 3 includes a pipe-line delay logic 8, an address comparator 9, a latch 91d for holding a reference address of the SCM address array 7, and a latch 91e for holding contents read out from the address array. The pipe-line delay logic 8 includes latches 91a to 91c for delaying a store address and data in the pipe line manner.

Numeral 103 denotes a set signal generated from the set signal generating logic 5a, 107 a cache hit check result, 109 a store address and data produced from the preceding-stage store buffer 1a, and 110 the store address and data delayed by the pipe-line delay logic 8. A signal 111 produced from the store buffer in the CPU is an output request for supplying contents of a designated entry from the following-stage store buffer 2a to the data array 6.

One feature of the embodiment 1 shown in FIG. 2 is that the store buffer is divided into two stages and the SCM hit check is made in the pipe line manner within the SCM hit check logic 3 between the preceding-stage store buffer 1a and the following-stage store buffer 2a so that a set of address and data of the store instruction having successful SCM hit check is supplied to the following-stage store buffer 2a.

Figure 3:
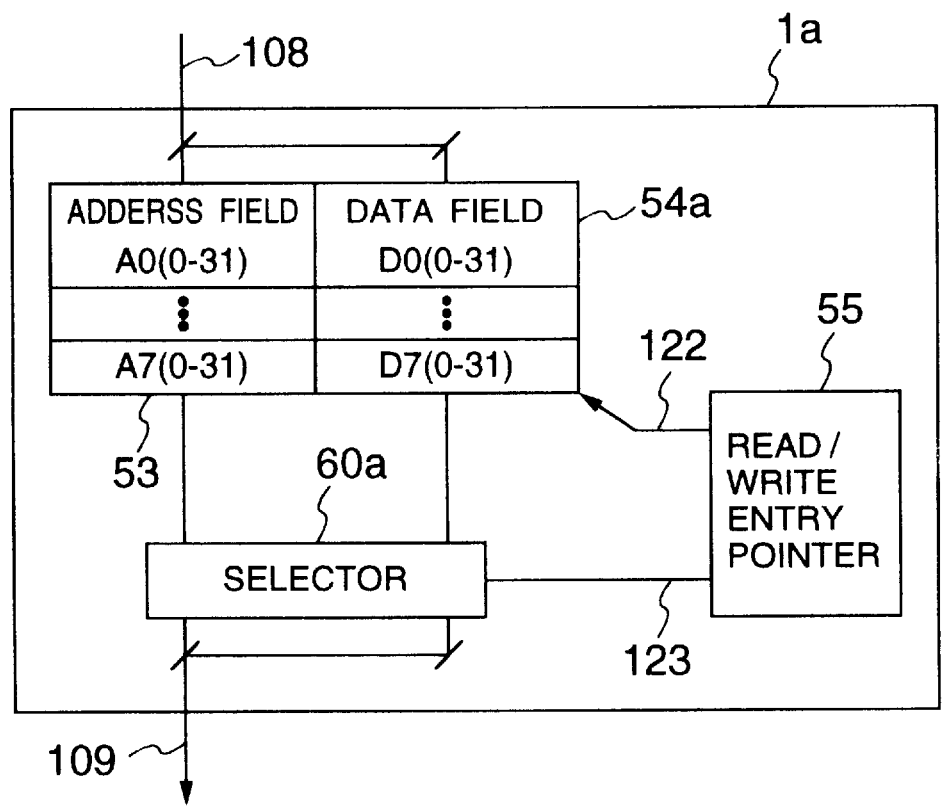
FIG. 3 is a schematic diagram illustrating a following-stage store buffer of the embodiment 1.

FIG. 3 schematically illustrates the preceding-stage store buffer 1a of FIG. 2. The preceding-stage store buffer 1a includes a first-in first-out type (FIFO) buffer. In FIG. 3, the preceding-stage store buffer 1a includes eight entries in the embodiment and each entry is composed of an address field 53 of 32 bits and a data field 54a of 32 bits in the embodiment. Numeral 55 denotes a read/write entry pointer, 122 a write entry signal, and 123 a read entry signal.

The store address and data 108 are written into an entry designated by the write entry signal 122 and an address and data in an entry designated by the read entry signal 123 are selected by a selector 60a and are outputted. A plurality of pairs of outputted addresses and data maintain the input order to the preceding-stage store buffer 1a.

The store address and data outputted from the store buffer 1a are sent to the main storage unit 4 so that the data is written in the store address and at the same time the store address and data are inputted to the SCM hit check logic 3. The SCM hit check logic 3 performs the SCM hit check in the pipe line manner.

Figure 4:
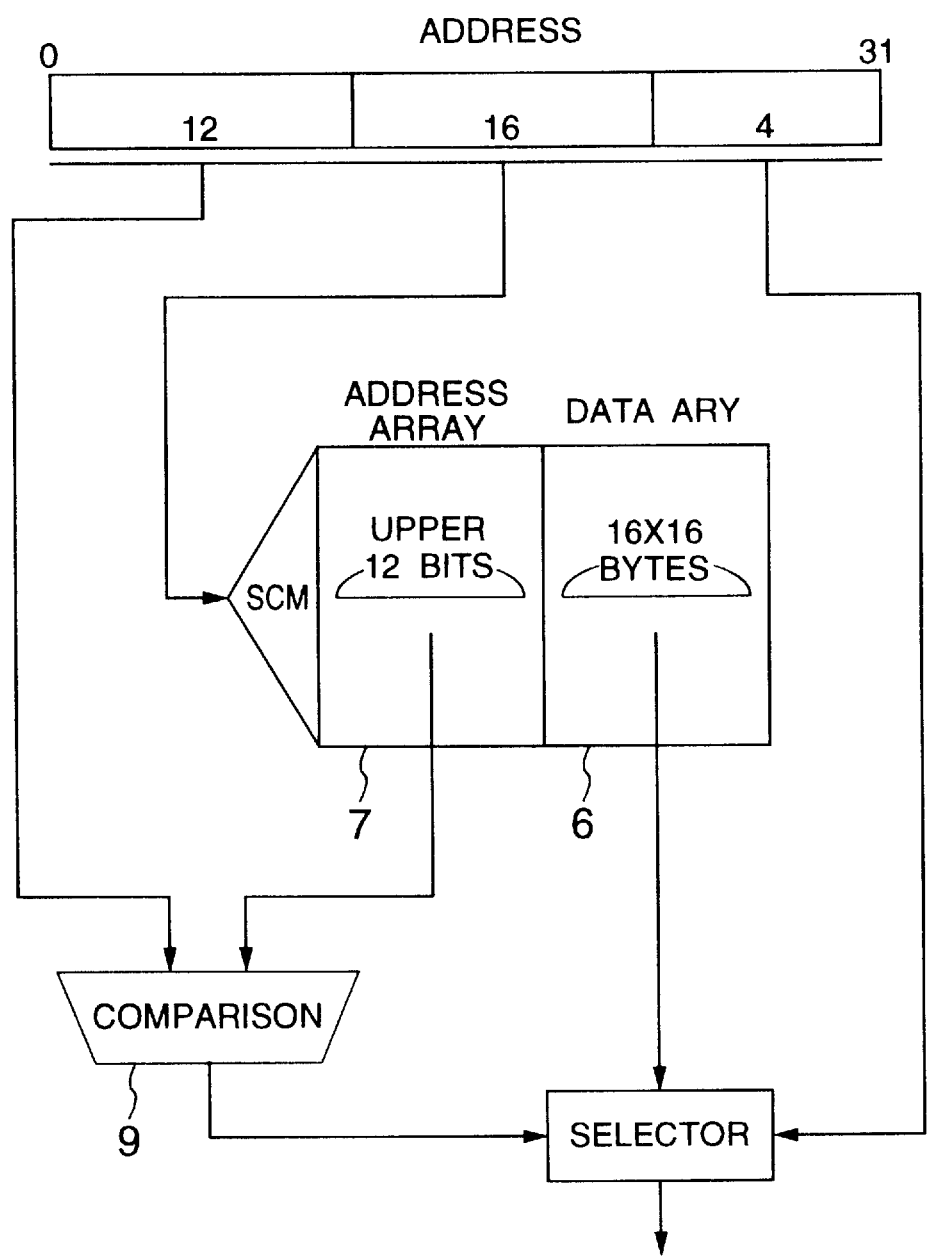
FIG. 4 is a schematic diagram for explaining a direct mapping method.

The address mapping of the SCM in the embodiment can use, for example, the direct mapping method. In FIG. 4, upper 12 bits (A0 to A11, tag), for example, of an address of 32 bits are inputted into one input of a comparator on the basis of a load instruction or a load instruction prior to execution of a store instruction. Further, for example, 16 bits (index) A12 to A27 of the address constitute a reference address of the address array 7 and the SCM of 64 k block is referred by the reference address to select one 16-byte block. Lower 4 bits A28 to A31 constitute an address in the block and data of 1 byte is selected. One block is constituted by 16 bytes.

The upper 12 bits (tag) are stored in the address array 7 and upper 12 bits read out by the reference address is supplied to the other input of the comparator. The index in the address is used to designate an entry of the address array 7 and the tag of the entry is read out. The tag in the address is compared with the tag in the address array 7 (at this time, an effective bit attached to the tag is also examined) and when both the tags are equal to each other, one block in the data array 6 or one byte designated by the intra-block address in the address is read out. Further, when both the tags are not equal to each other, the main storage unit is accessed.

Figure 5:
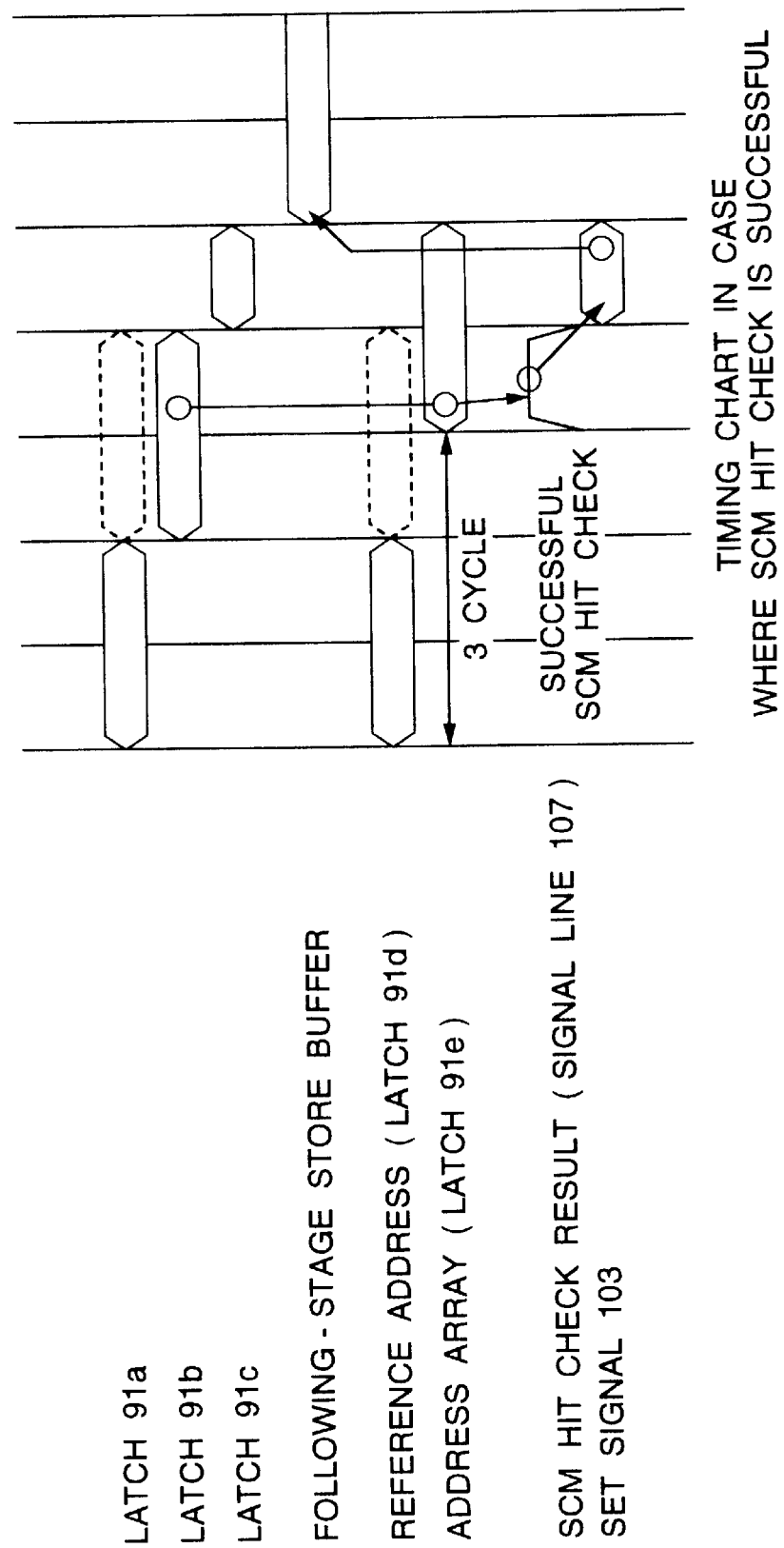
FIG. 5 shows an operation example of an SCM hit check logic.

FIG. 5 shows an operation example of the SCM hit check logic 3. The store address and data are delayed in the pipe line manner by the pipe-line delay logic 8 composed of the latches 91a to 91c. Further, the latch 91d holds the reference address (that is, the index) of the address array 7. As an embodiment of the SCM, there is considered an SCM from which contents (that is, the tag) of the address array 7 are read out three machine cycles of the CPU shown by vertical lines after the reference address of the address array is applied thereto as shown in FIG. 5. It is assumed that the SCM is constituted by a latched static RAM from which data can be read out successively by applying an address to the static RAM at a pitch of two cycles. Until the contents of the address array 7 are read out, the store address is delayed by the latches 91a and 91b. The store address (tag) of the latch 91b is compared with the contents (tag) of the address array 7 held in the latch 91e by the address comparator 9 to make the SCM hit check. The result 107 of the SCM hit check is as follows:

"1" for successful SCM hit check
"0" for unsuccessful SCM hit check

When the SCM hit check result 107="1" (successful), the set signal generating logic 5a generates the set signal 103 for the following-stage store buffer 2a.

As described above, in the embodiment, the SCM hit check is made in the pipe line manner and accordingly when the contents 102 of the address array 7 are outputted, a next store instruction is immediately inputted to the SCM hit check logic 3 from the preceding-stage store buffer 1a. Consequently, the time that one store instruction occupies the SCM can be shortened and the busy rate of the cache memory can be reduced. In FIG. 5, the address inputted next to the addresses for the latches 91a and 91d is shown by broken line.

Figure 6:
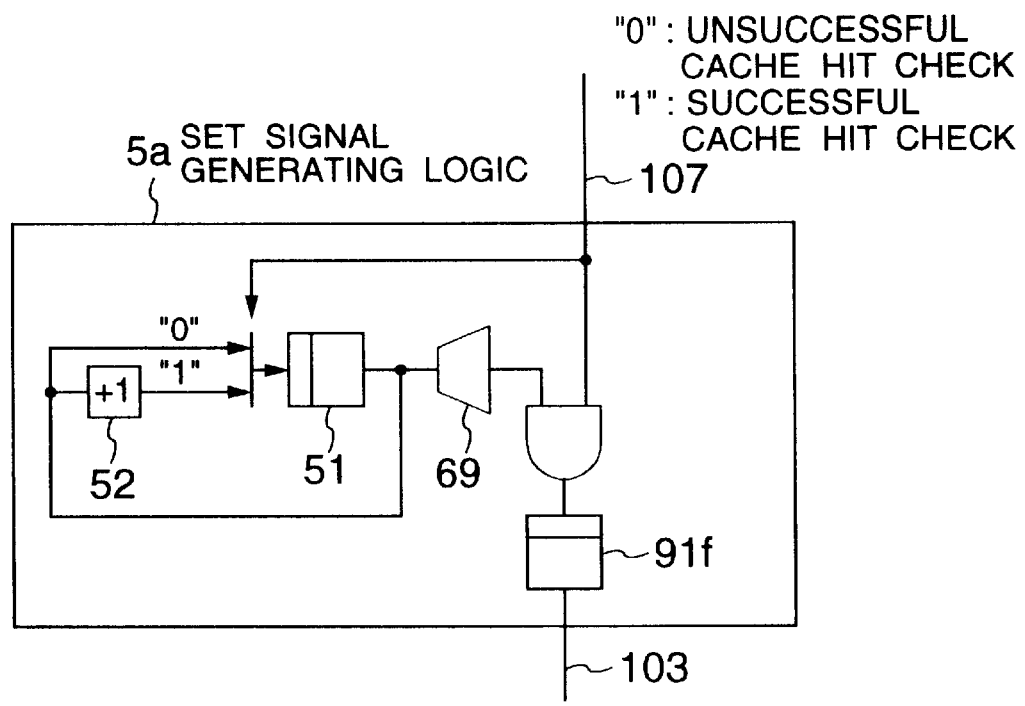
FIG. 6 is a schematic diagram illustrating a set signal generating logic of the embodiment 1.

FIG. 6 schematically illustrates the set signal generating logic 5a for generating the set signal 103. Numeral 51 denotes a writer pointer latch of the following-stage store buffer 2a, and 52 an update logic. The latch 51 has a value of 0 to 7 and the update logic 52 increments the value of the latch 51 by 1. When the value of the latch 51 is equal to 7, the update logic 52 outputs 0. Numeral 69 denotes a decoder which outputs the following value in accordance with the value of the Latch 51.

| Value of Latch 51 | Output of Decoder 69 |
| --- | --- |
| 0 | "10000000" |
| 1 | "01000000" |
| 2 | "00100000" |
| 3 | "00010000" |
| 4 | "00001000" |
| 5 | "00000100" |
| 6 | "00000010" |
| 7 | "00000001" |

Numeral 103 denotes a set signal inputted to the following-stage store buffer 2a. The set signal 103 is composed of 8 bits since the following-stage store buffer 2a has 8 entries, and a store address, a store data and an effective bit are inputted to the entry of the following-stage store buffer in which "1" is set. That is the 0th bit of the set signal 103 indicates inputting to the 0th entry and similarly the 7th bit indicates inputting to the 7th entry. For example, the set signal 103 indicating inputting to the 3rd entry is "00010000". When the set signal 103 is all "0", inputting is not made to any entry of the following-stage store buffer 2a. The set signal 103 is generated as follows:

(1) When the SCM hit check result 107="1" (successful), the selector selects the update logic 52 and accordingly the output of the decoder 69 is produced through the AND gate as the set signal 103. Further, the value of the latch 51 is updated by the update logic 52.

(2) When the SCM hit check result 107="0" (unsuccessful), the selector selects "0" and accordingly all "0" is produced as the set signal 103. The value of the latch 51 is not updated.

Figure 7:
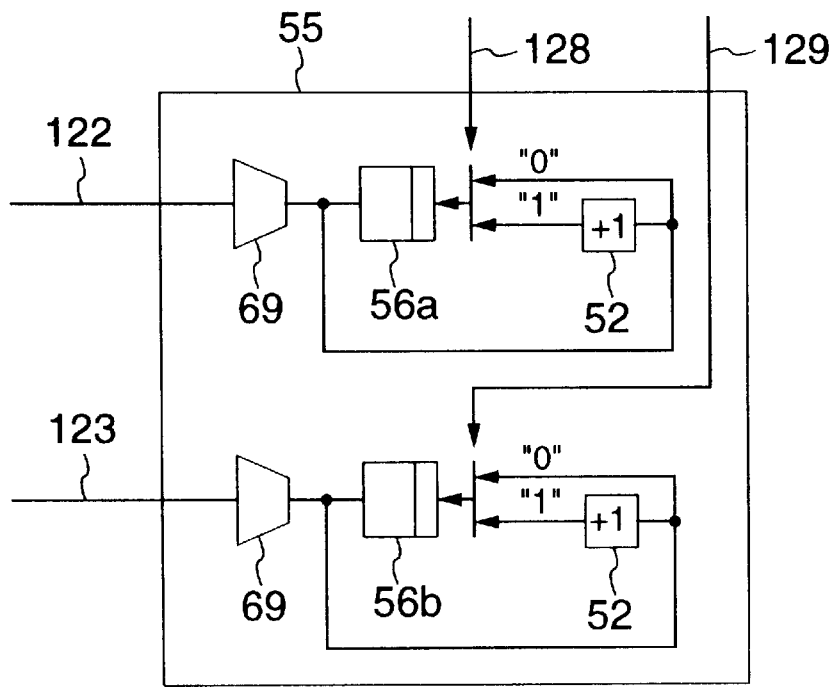
FIG. 7 is a schematic diagram illustrating a read/write pointer.

FIG. 7 schematically illustrates the read/write entry pointer 55 in the preceding-stage store buffer 1a. Numeral 56a denotes a write pointer latch, 56b a read pointer latch, 52 the update logic described above, 69 the decoder described above, 128 a write request signal from the instruction execution unit, and 129 a read request signal from the instruction execution unit.

In the embodiment, since the preceding-stage store buffer 1a has 8 entries, the write pointer latch 56a and the read pointer latch 56b both have values of 0 to 7. Each time the write request signal 128 becomes 1, a store address and data are written in the preceding-stage store buffer 1a and the write pointer latch 56a is updated to indicate a next value. Further, each time the read request signal 129 becomes "1", a store address and data are outputted from the preceding-stage store buffer 1a and the read pointer latch 56b is updated to indicate a next value. The update logic 52 produces 0 when a value of the write pointer latch 56a or the read pointer latch 56b is 7.

Figure 8:
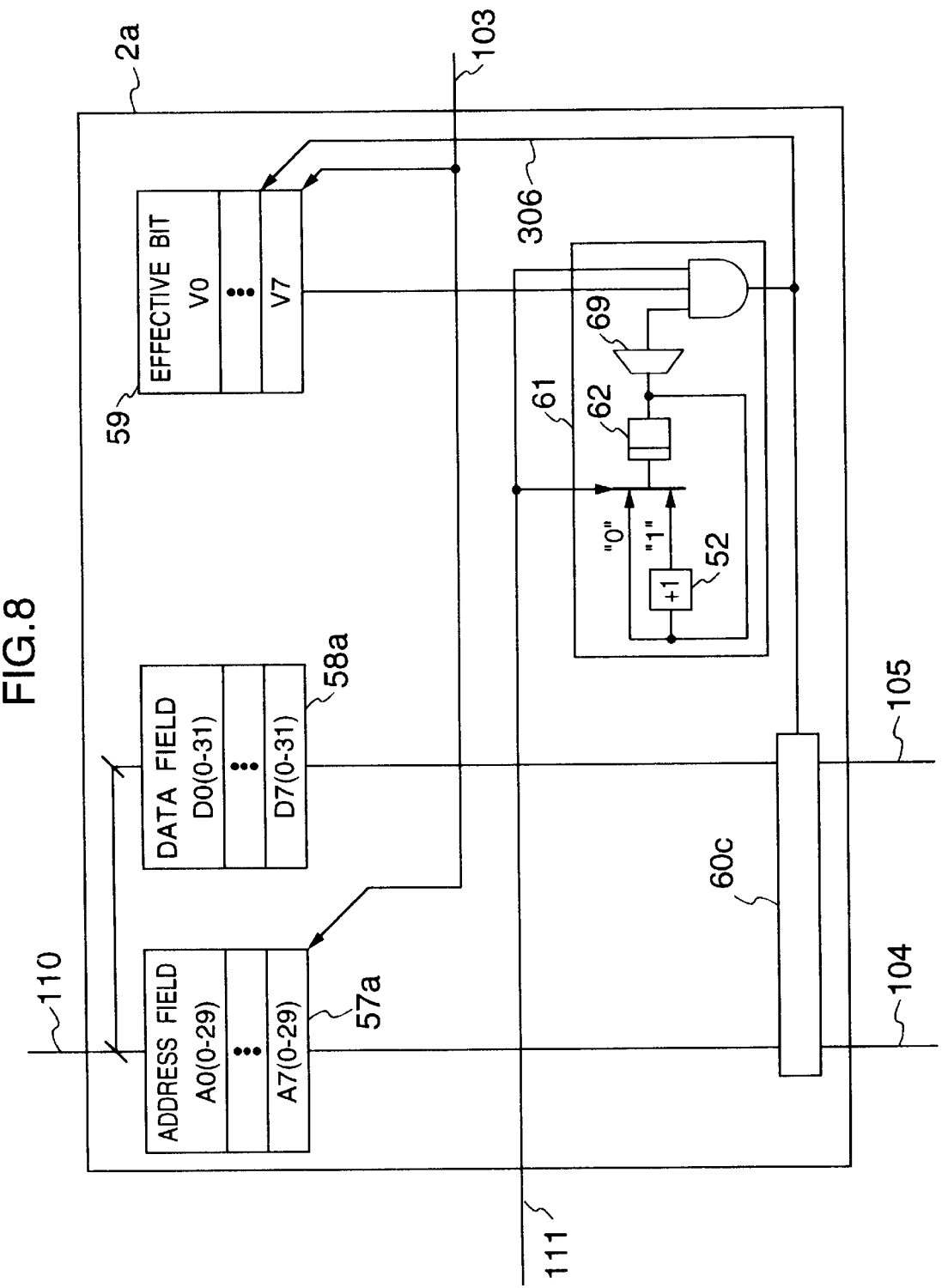
FIG. 8 is a schematic diagram illustrating the following store buffer of the embodiment 1.

FIG. 8 schematically illustrates the following-stage store buffer 2a of FIG. 2. In the embodiment shown in FIG. 8, the following-stage store buffer 2a has 8 entries, each of which includes an address field 57a of 30 bits, a data field 58a of 32 bits and an effective bit 59 of 1 bit.

The reason that the address field has not the same structure of 32 bits as that of the preceding-stage store buffer 1a is that since the data field 58a constituted by 32 bits (4 bytes) is aligned (address alignment), lower two bits (30th and 31th bits) of the store address are not required to be used upon writing to the SCM. That is, one block of the data array is constituted by 4 bytes.

Numeral 61 denotes a read pointer of the following-stage store buffer 2a, 62 a read pointer latch, 52 the update logic described above, and 69 the decoder described above. The latch 62 has a value of 0 to 7 and the update logic 52 increments a value of the latch 62 by 1. When a value of the latch 62 is 7, the update logic 52 outputs 0.

Numeral 103 denotes the set signal from the set signal generating logic 5a, 111 an output request signal from the instruction execution unit, 104 a write address to the SCM data array and 105 a write data to the SCM data array.

The store address and data delayed by the pipe-line delay logic 8 are inputted through a signal line 110 and the store address is inputted into the entry in the address field 57a indicated by the set signal 103 while the data is inputted into the entry in the data field 58a indicated by the set signal 103. At the same time, the effective bit 59 in the corresponding entry is set to "1". When the set signal 103 is all "0", the store address and data are not inputted to any entry. At this time, the effective bit 59 is not changed. That is, the store instruction having unsuccessful SCM hit check is not inputted into the following-stage store buffer 2a.

On the other hand, outputting from the following-stage store buffer 2a to the SCM is made from the entry indicated by the output entry 306. The output entry 306 is constituted by 8 bits since the following-stage store buffer 2a is constituted by 8 entries in the embodiment. The 1st bit of the output entry indicates that the 1st entry is outputted and similarly the 7th bit indicates that the 7th entry is outputted. For example, a value of the entry 306 which outputs the 0th entry is "10000000". The output entry 306 is generated as follows:

(a) When the output of the decoder 69="1", the effective bit 59="1" (effective), and the entry output request 111="1" (effective), the corresponding bit of the output entry 306="1", (b) Otherwise, the corresponding bit of the output entry 306="0".

The selector 60c selects a store address from the address field 57a of the entry indicated by the output entry 306 to output the store address to the signal line 104 and selects data from the data field 58a to output the data to the signal line 105. When the output entry 306 is all "0", any entry is not outputted. At the same time as the outputting of the store address and data, the effective bit of the outputted entry is reset. Further, the value of the latch 62 for indicating a next entry is updated by the update logic 52.

The entry output request signal 111 is a control signal produced when there is a store instruction in the following-stage store buffer 2a and the SCM is not operated.

Figure 9:
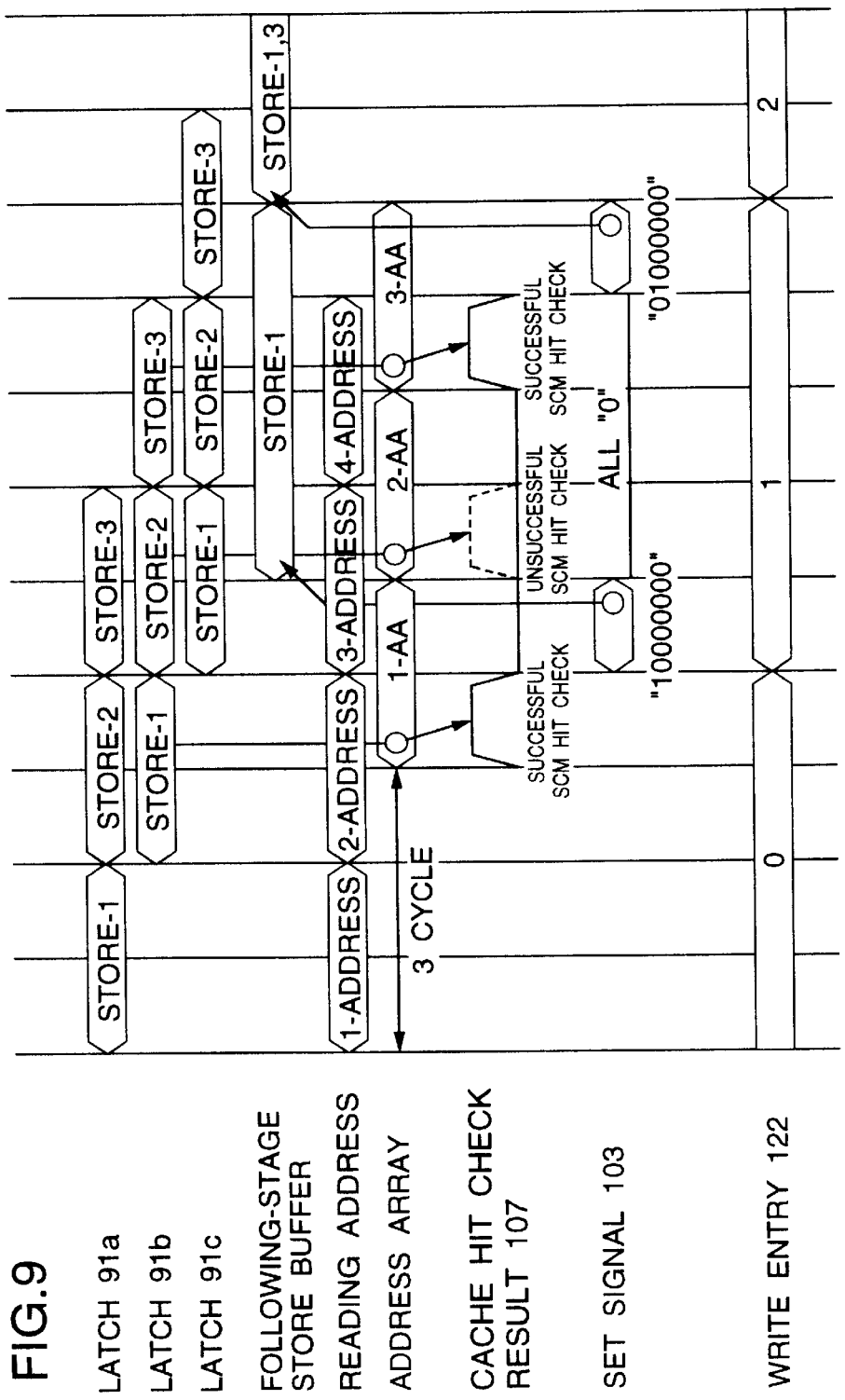
FIG. 9 shows an operation example of the embodiment 1.

FIG. 9 shows a timing chart when the store instructions are processed continuously in the embodiment 1 of FIG. 2 and shows, by way of example, the case where three store instructions of Store-1 to Store-3 are outputted from the preceding-stage store buffer 1a continuously. It is assumed that the Store-1 and Store-3 are successful in the SCM hit check and the Store-2 is unsuccessful in the SCM hit check. Further, in the embodiment, the signal line 106 can accept the store instructions to the main storage unit at a pitch of two cycles.

Operation is now described. At the same pitch of two cycles as in writing to the main storage unit, the store address and data are inputted to the latch 91a and the reference address (index in the store address) of the address array is inputted to the latch 91d. Contents (that is, tag) of the address array 7 designated by the index are read into the latch 91e after three cycles. In other words, the value of the latch 91e is changed at a pitch of two cycles.

The contents (tag) of the address array held in the latch 91e are compared with the tag of the store address delayed by the latch 91b by the address comparator 9 to produce the SCM hit check result 107. Consequently, values of the set signal 103 and the read/write entry pointer or the latch 55 (FIG. 3) are changed as follows:

Store-1 having successful SCM hit check:
Set signal 103="10000000": Latch 55=1
Store-2 having unsuccessful SCM hit check:
Set signal 103="00000000": Latch 55=1
Store-3 having successful SCM hit check:
Set signal 103="01000000": Latch 55=2

Accordingly, the store address and data of Store-1 are held in the address field 57a and the data field 58a of the 0th entry in the following-stage store buffer 2a indicated by the set signal 103, respectively, (at the same time the corresponding effective bit 59 is also set). Similarly, the store address and data of Store-3 are held in the 1st entry in the following-stage store buffer 2a and the value of the latch 55 becomes 2.

The store instruction held in the following-stage store buffer 2a is written into the data array 6 of the SCM from the following-stage store buffer 2a in response to the output request 111 from the instruction execution unit. In other words, the entry designated by the read pointer 61 is selected by the selector 60c and the data array 6 is accessed by the data array write address constituted by the address field 57 of the selected entry. The data array write address is upper 30 bits except lower two bits and the data (32 bits) of the entry designated by the read pointer 61 is written in the block designated by the address.

[EMBODIMENT 2]

An embodiment 2 is now described. Most of data of the integer type normally have a width of 4 bytes (32 bits), while floating point data are required to have a width of 8 bytes (64 bits) for the double precision. When the width of the data field is 8 bytes so as to be able to store the floating point data into one entry, blank portions are produced uselessly when data of 4 bytes of the integer type is stored.

Accordingly, by setting the width of the data field to 8 bytes and storing data corresponding to a store instruction having a store address into 8 bytes containing data provided in the data field by another store instruction, that is, by merging data to use one entry, the integer type data can be stored without uselessness and the floating point data can be stored into one entry. The process for merging store instructions using the same entry to use one entry is named merging of data in the embodiment. Thus, the merging of data is made for the following-stage store buffer. That is, when the store data already stored in the following-stage store buffer and the store data to be inputted in the following-stage store buffer can be merged into the same entry, merging of the data is made.

With respect to whether data can be merged or not, since the data field is 8 bytes, upper 29 bits (0th to 28th bits) of the store addresses except lower 3 bits are compared to thereby confirm whether the same entry can be used or not. As a result of comparison of the store addresses, when data can be merged (described later using a signal 121 in FIG. 10), a new store data is written in the existing data field.

However, even when the width of the data field is set to 8 bytes, merging of data is not made in the preceding-stage store buffer 1a having the purpose of ensuring the order of writing to the main storage unit 4.

Since the width of the data field is expanded to 8 bytes, it is necessary to store information expressing where effective data exists in the data field. Thus, information expressing a byte position in which effective data exists is provided in each entry of the data field. This information is named a byte mask.

A value of the byte mask is
 "1" for existence of effective data
 "0" for nonexistence of effective data.
For example, when effective data exist in 0th to 3rd bytes, the byte mask is "11110000".

Figure 10:
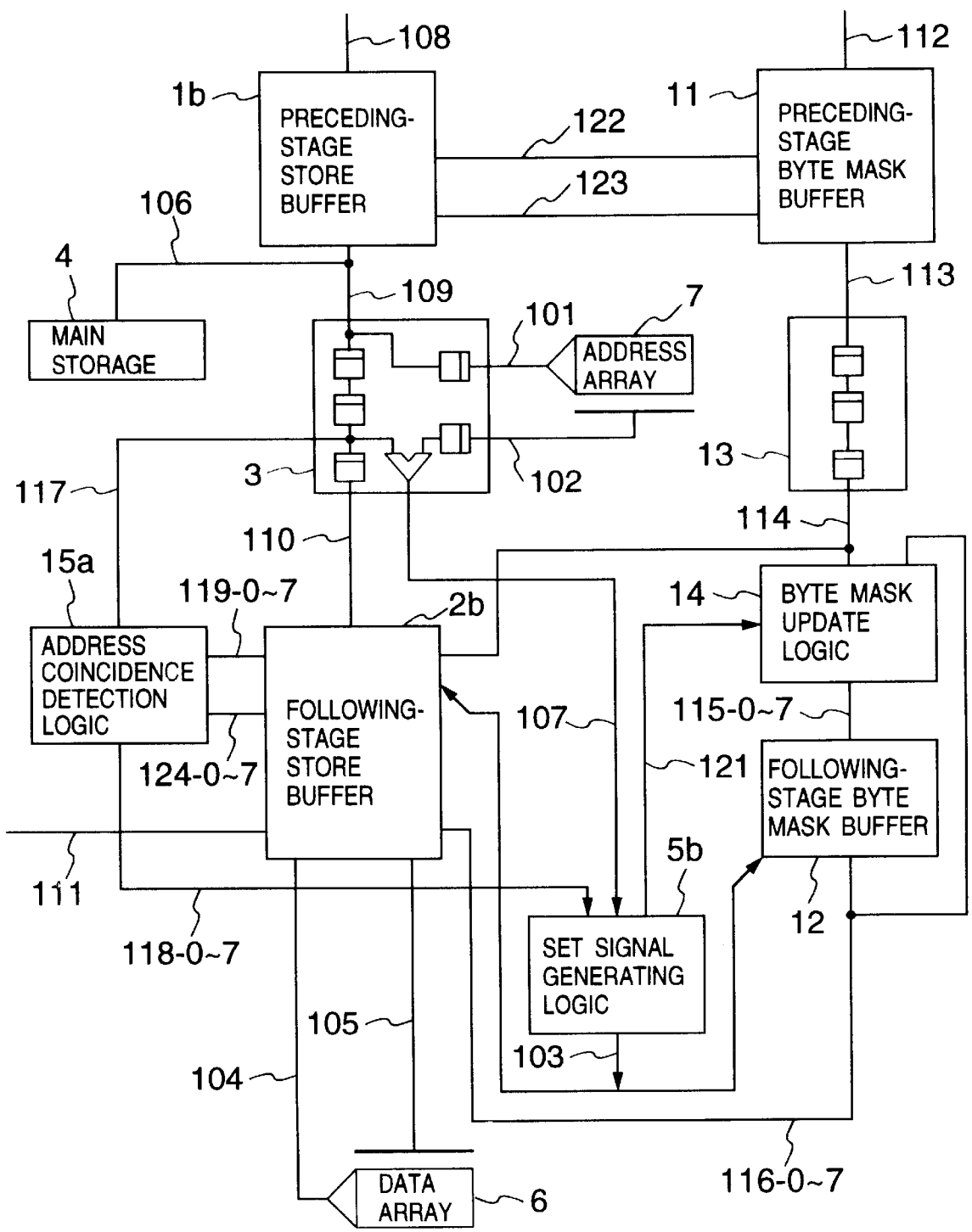
FIG. 10 is a schematic diagram illustrating an embodiment 2.

FIG. 10 schematically illustrates an embodiment 2 of the present invention. The embodiment 2 includes a preceding-stage byte mask buffer 11, a following-stage byte mask buffer 12, a byte mask delay logic 13, a byte mask update logic 14 and an address coincidence detection logic 15a in addition to the configuration of the embodiment 1.

Figure 11:
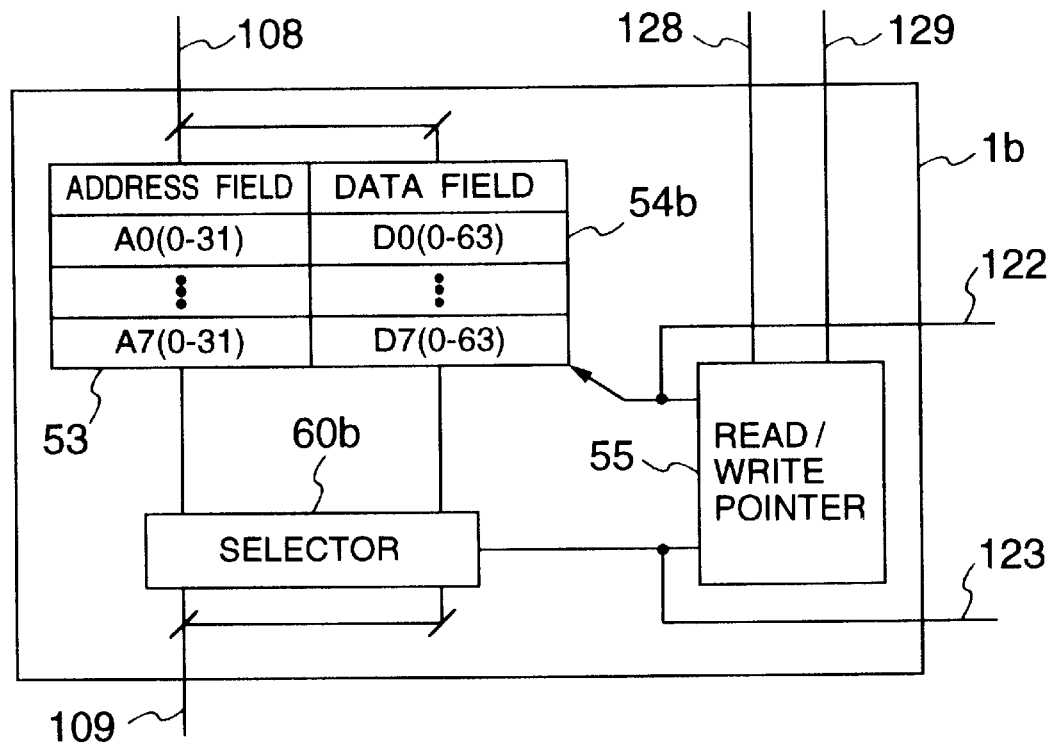
FIG. 11 is a schematic diagram illustrating a preceding-stage store buffer of the embodiment 2.

FIG. 11 is a schematic diagram illustrating the preceding-stage store buffer 1b of the embodiment 2. In order to ensure the order of writing to the main storage unit 4, the preceding-stage store buffer 1b is constituted by a first-in first-out type (FIFO) buffer and includes 8 entries in the embodiment. The data field 54b has the width of 8 bytes (64 bits) in the embodiment. Signal lines 122 and 123 are used for writing to the preceding-stage byte mask buffer 11 and outputting there-from, respectively. Signal lines 128 and 129 are used for write and read requests from the instruction execution unit. The read/write pointer 55 and the selector 60b have the same functions as those described in the embodiment 1.

Figure 12:
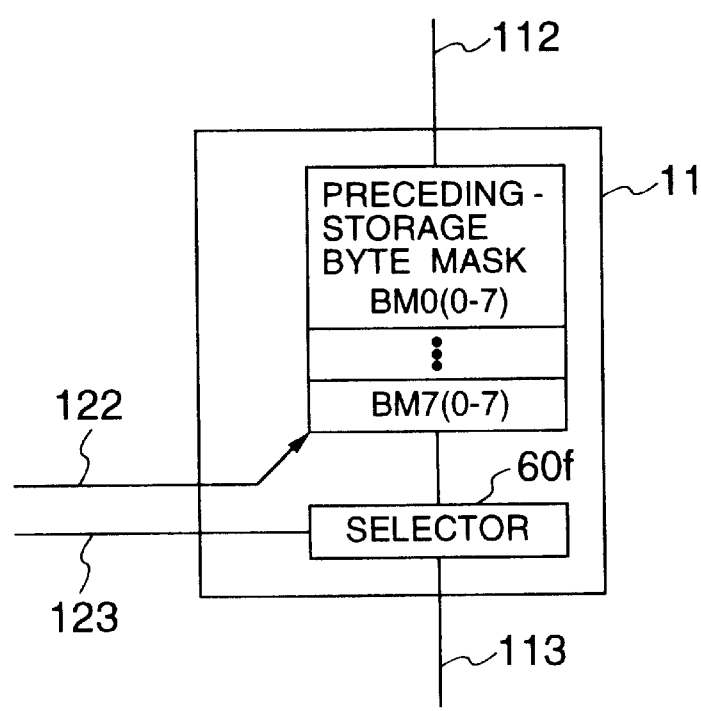
FIG. 12 is a schematic diagram illustrating a preceding-stage byte mask buffer.

FIG. 12 is a schematic diagram illustrating the preceding-stage byte mask buffer 11. Since the data field 54b of FIG. 11 has 8 bytes for one entry in the embodiment, one entry of the byte mask is constituted by 8 bytes. The preceding-stage byte mask buffer 11 has 8 entries in the same manner as the preceding-stage store buffer 1b. The byte mask inputted through the signal line 112 from the instruction execution unit of the CPU is inputted into an entry designated by the write entry 122. An output from the preceding-stage byte mask buffer selects a byte mask of an entry designated by the read entry 123 from the read/write entry pointer 55 of FIG. 3 by means of the selector 60f at the same time as outputting of the preceding-stage store buffer 1b.

The byte mask 113 outputted from the preceding-stage byte mask buffer 11 is delayed in the byte mask delay logic 13 until the timing that the SCM hit check is completed and then passes through the byte mask update logic 14. The byte mask 113 is then inputted to the following-stage byte mask buffer 12.

Figure 13:
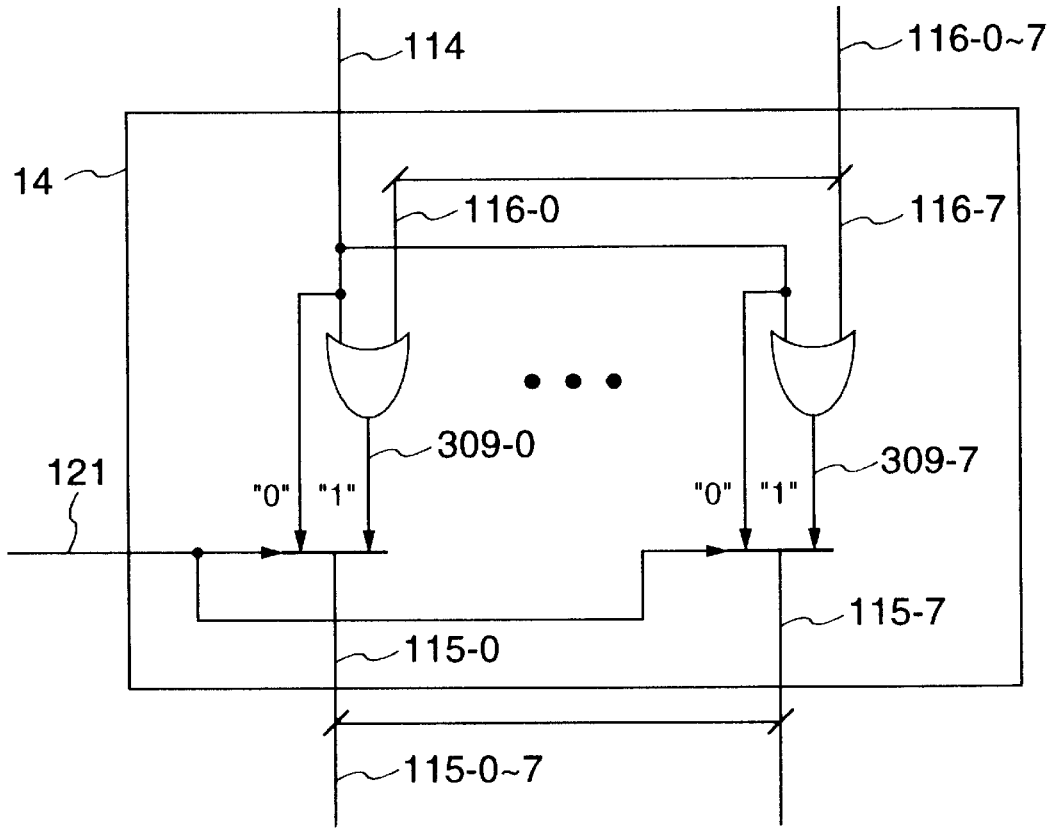
FIG. 13 is a schematic diagram illustrating a byte mask update logic.

FIG. 13 is a schematic diagram illustrating the byte mask update logic 14. Numeral 114 denotes a byte mask delayed in the byte mask delay logic 13. Numerals 116-0 to 7 denote byte masks held in the following-stage byte mask buffer 12 and 116-0 a byte mask for the 0th entry, . . . , 116-7 a byte mask for the 7th entry. Numerals 115-0 to 7 denote inputs to the following-stage byte mask 12 and 115-0 an input to the 0th entry, 115-7 an input to the 7th entry. Numeral 121 denotes a signal indicating whether data is merged or not (described later in FIGS. 18 and 19) and which is defined as follows:
 "0" for not merged, and
 "1" for merged.
The inputs 115-0 to 7 of the following-stage byte mask buffer 12 are produced in accordance with the presence of merging of data as follows:

(a) When the signal line 121="0" (data is not merged), the byte mask 114 of the store date is inputted to the following-stage byte mask buffer 12.
(b) When the signal line 121="1" (data is merged), a logical sum of the byte mask 114 of the store data and the existing byte mask 116-0 to 7 are inputted to the following-stage byte mask buffer 12.

Figure 14:
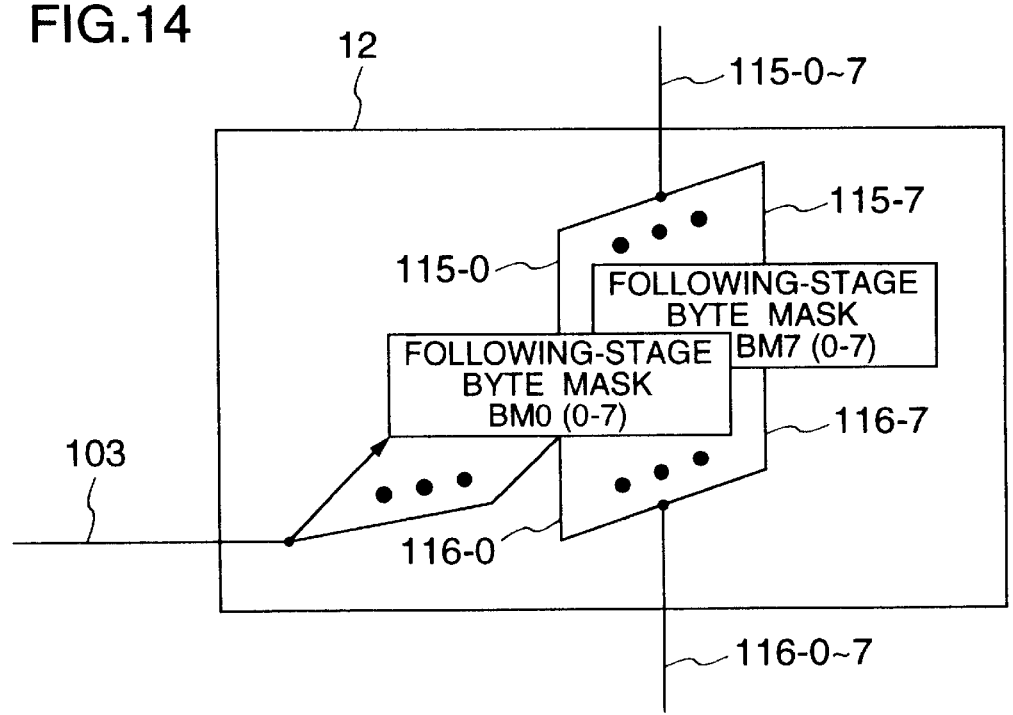
FIG. 14 is a schematic diagram illustrating a following-stage byte mask buffer.

FIG. 14 is a schematic diagram illustrating the following-stage byte mask buffer 12. In the embodiment, the following-stage byte mask buffer 12 includes 8 entries each of which has 8 bits and indicates a byte position in the data field 58b in which effective data exists. Numeral 115-0 to 7 denote inputs to the entries and 116-0 to 7 outputs from the entries. The inputs are not common to the entries differently from the preceding-stage byte mask buffer 11 but individual for each entry. Only the byte mask of the entry indicated by the set signal 103 is written and the byte masks of other entries are not changed.

Figure 15:
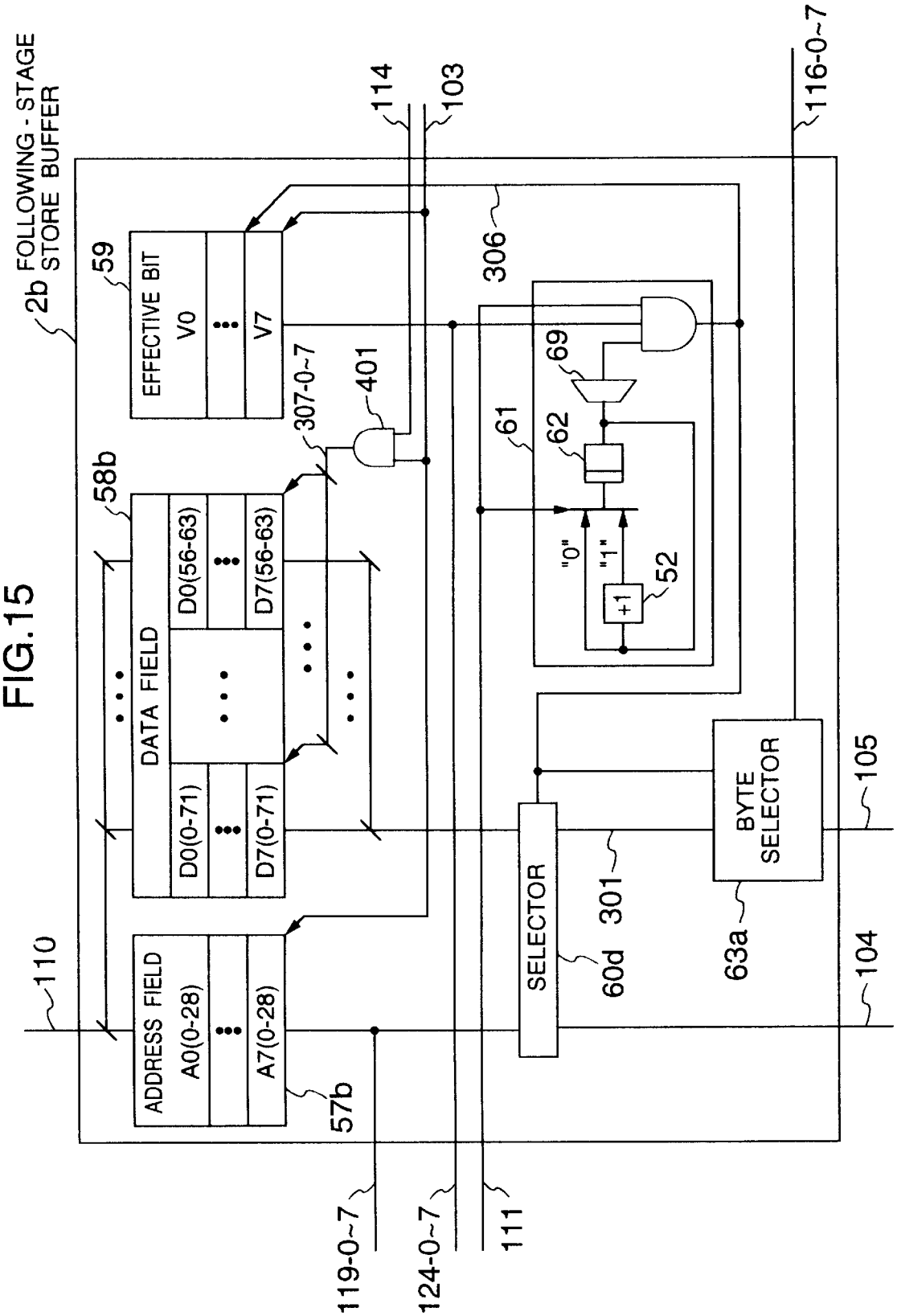
FIG. 15 is a schematic diagram illustrating a following-stage store buffer of the embodiment 2.

FIG. 15 is a schematic diagram illustrating the following-stage store buffer 2b of the embodiment 2. In the embodiment 2, each entry includes an address field 57b of 29 bits, a data field 58b of 64 bits (8 bytes) and an effective bit 59 of one bit. The reason that the address field is not constituted by 32 bits is that since the data field 58b is constituted by 64 bits, that is, one block of the SCM data array is constituted by 64 bits (8 bytes), a block entry is designated by upper 29 bits of the store address and lower 3 bits (29th to 31st bits) are not used upon writing of the SCM data array.

Numeral 60d denotes a selector for selecting entries outputted from the address field 57b and the data field 59b, and 63a a byte selector for taking out store data at the byte position in which effective data exists.

Numeral 103 denotes a set signal (described later in FIG. 16), 104 a data array write address, 105 write data, 110 a store address and data delayed in the pipe-line delay logic 3, 114 an output of the byte mask delay logic 14, 111 an output request, 116-0 to 7 contents of the following-stage byte mask buffer 12, 119-0 to 9 contents of the address field 57b, and 124-0 to 7 values of the effective bits 59.

The data field 58b is constituted so that the store data can be set therein for each byte. The set signal 307-0 of the data field 58b is the 0th set signal, . . . , the set signal 307-7 is the 7th set signal.

The store address and data delayed in the pipe-line delay logic 3 are inputted from the signal line 110, so that the store address is inputted in the entry of the address field 57b indicated by the set signal 103 and the data is inputted in the byte position of the entry of the data field 58b indicated by the set signal 307-0 to 7. The effective bit 59 of the entry is set to "1" at the same time as inputting of the store address and data. When the set signal 103 is all "0", the store address and data are not held in any entry and are abandoned. At this time, the effective bit 59 is not changed. That is, the store instruction having unsuccessful SCM hit check is not inputted to the following-stage store buffer 2b.

On the other hand, outputting from the following-stage store buffer 2b is made from the entry indicated by the output entry 306. The selector 60d selects the store address from the address field 57b to output the store address to the signal line 104 and selects data from the data field 58b to output the data to the signal line 301 on the basis of the output entry 306. The effective bit of the outputted entry is reset at the same time as outputting of the store address and data. Further, the value of the latch 62 is updated by the update logic 52. The byte selector 63a takes out effective store data to output the data to the signal line 105.

The output request signal 111 is a control signal produced when a store instruction is present in the following-stage store buffer 2b and the SCM is not operated.

Figure 16:
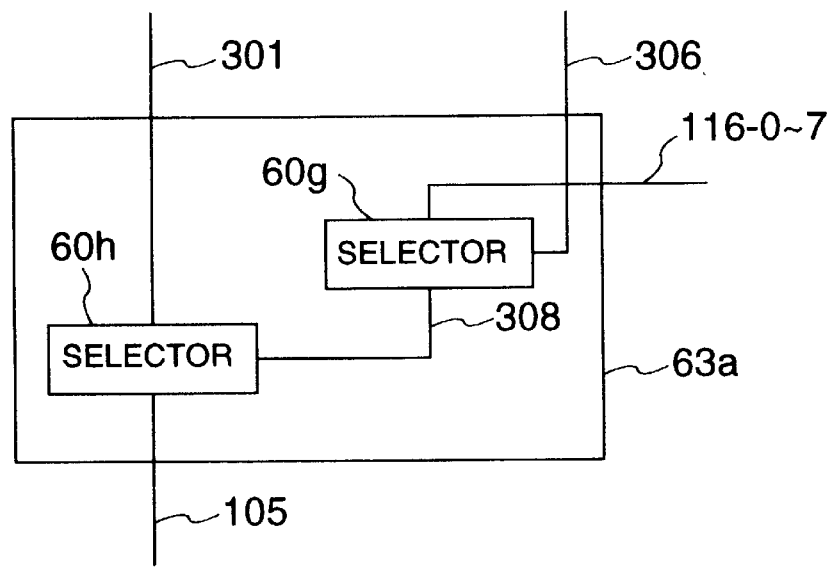
FIG. 16 is a schematic diagram illustrating a byte selector.

FIG. 16 is a schematic diagram illustrating the byte selector 63a. Numeral 60g denotes a selector for taking out a byte mask 308 of an entry from the contents 116-0 to 7 of the following-stage byte mask buffer on the basis of the output entry 306. The selector 60h takes out effective data from the store date 301 on the basis of the byte mask 308.

Figure 17:
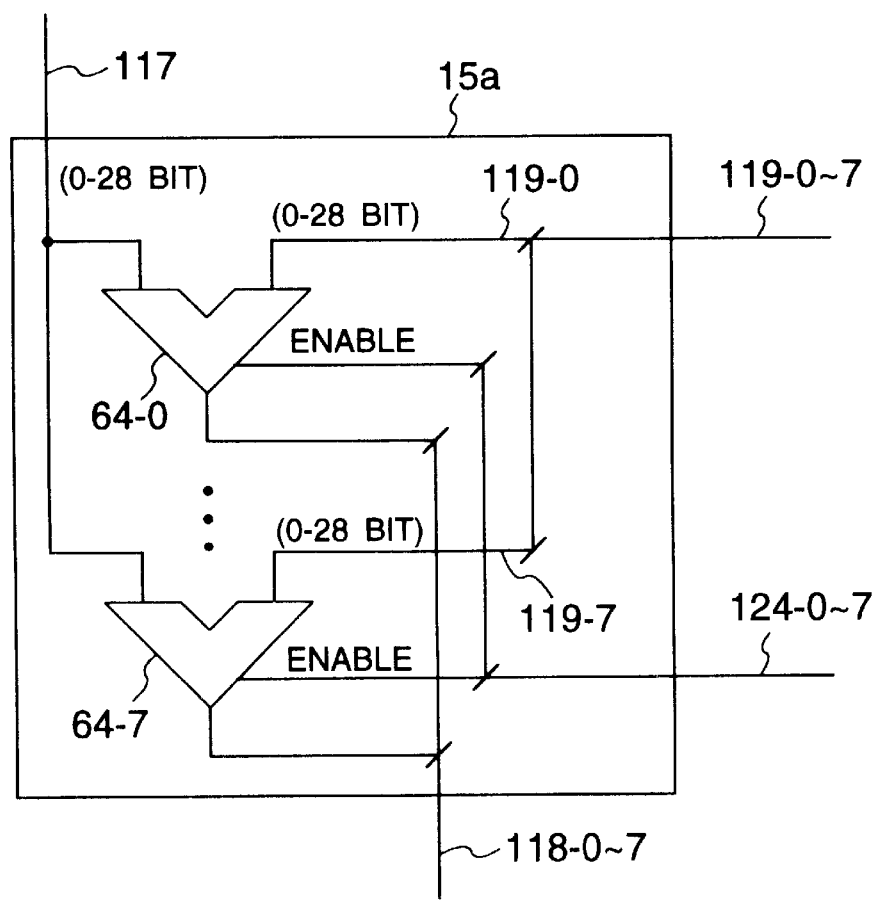
FIG. 17 is a schematic diagram illustrating an address coincidence logic.

FIG. 17 is a schematic diagram illustrating the address coincidence detection logic 15a for examining merging of data. Numerals 64-0 to 7 denote address comparators for 29 bits, 117 the store address of the store data capable of being inputted in the following-stage store buffer 2b, 119-0 to 7 contents of the address field of the store data already present in the following-stage store buffer 2b, and 124-0 to 7 contents of the effective bits 59.

The store address 117 of 29 bits is inputted to one input of each of the address comparators 64-0 to 7 and the contents A0 to A7 of the address field 57b are inputted to the other input of each of the address comparators 64-0 to 7 as 119-0 to 7, so that it is examined whether which store data already present in the following-stage store buffer 2b can be merged with the store data having the store address 117 or not. Numerals 118-0 to 7 denote signal lines indicating that the addresses are coincident with each other and the store data can be merged. The signal line 118-0 indicates that the store data having the store address 117 can be merged with the data of the 0th entry of the following-stage store buffer 2b, . . . , the signal line 118-7 indicates that the store data can be merged with the data of the 7th entry.

However, the address comparators 64-0 to 7 compare 0th to 28th bits of the store address 117 with the contents 119-0 to 7 of the address field 57b when an enable signal (effective bit 59 of FIG. 15) is "1" (effective). When both the addresses are coincident, the address comparators produce "1" and when not coincident, the comparators produce "0". When the enable signal (effective bit 59) is "0" (ineffective), the comparators produce "0".

Figure 18:
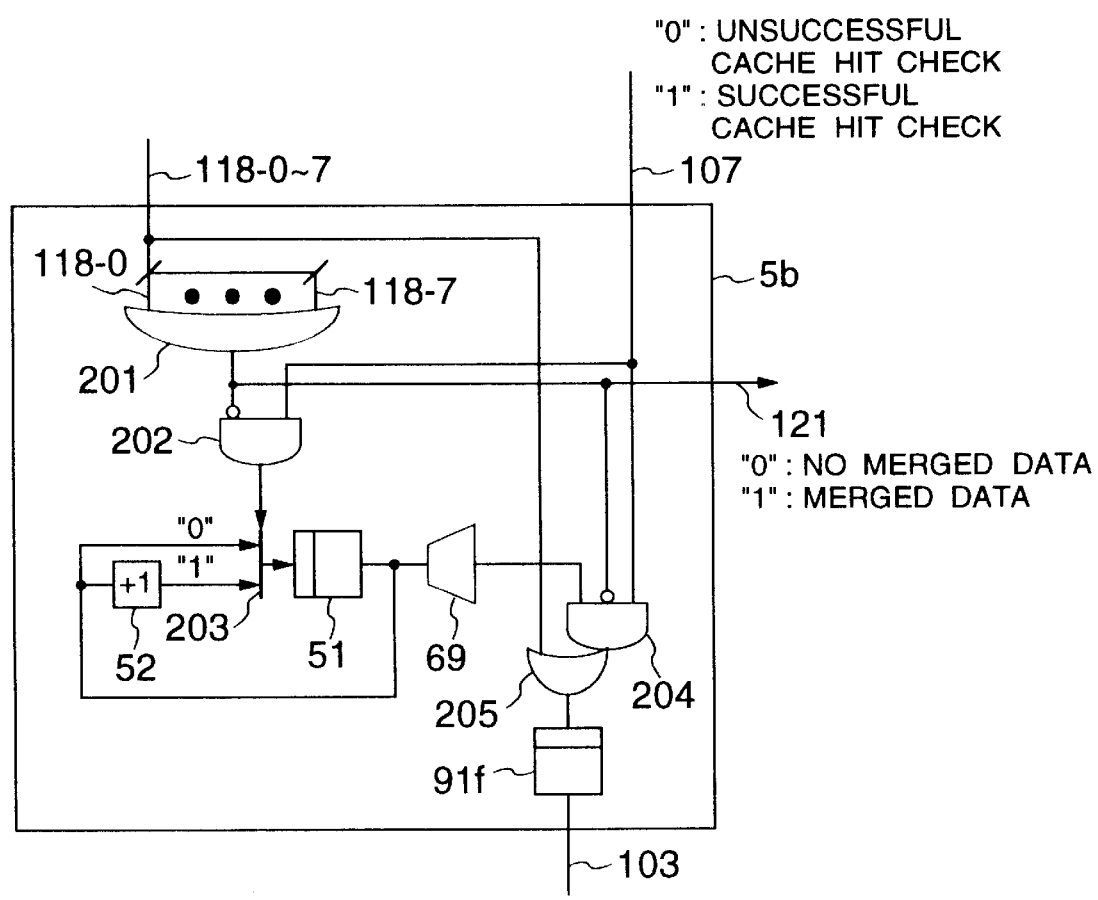
FIG. 18 is a schematic diagram illustrating a set signal generating logic of the embodiment 2.

FIG. 18 is a schematic diagram illustrating the set signal generating logic 5b of the embodiment 2 shown in FIG. 10. Numeral 121 denotes a signal produced from an OR gate 201 when the signals 118-0 to 7 indicating that the data can be merged in FIG. 17 are inputted to the OR gate 201. When the signal is "1", it is indicated that the data are merged and when the signal is "0", it is indicated that the data are not merged due to impossibility of merging.

The set signal generating logic 5b is operated in accordance with the conditions as follows;

a) When the signal line 107="0" (successful SCM hit check) and the signal line 121="0" (no merging of data), the selector 203 selects the output on the side of the update logic 52 in accordance with the output "1" of the AND gate 202. A value of the latch 51 is produced through the decoder 69 and is then produced through the AND gate 204 and the OR gate 205 as the signal 103. In this case, since the data are not merged, the data is inputted to the entry of the following-stage store buffer 2b (FIG. 10) indicated by the signal 103 in the same manner as the embodiment 1. Further, at this time, since the byte mask 114 from the preceding-stage byte mask buffer 11 is inputted to the following-stage store buffer 2b through the AND gate 401 (FIG. 15), the data is inputted to the byte position indicated by the byte mask 14. Furthermore, the value of the latch 51 is updated by the update logic 52.

(b) When the signal line 107="1" (successful SCM hit check) and the signal line 121="1" (data are merged), the output of the AND gate 202 is "0" so that the selector 203 selects "0" and the decoder 69 is all "0". Further, the output of the AND gate 204 is "0". Accordingly, the signals 118-0 to 7 indicating the entry number are outputted through the OR gate 205 as the signal 103.

The signal indicating the entry number is inputted to the following-stage store buffer 2b of FIG. 15 and at the same time the byte mask 114 of the store data is inputted thereto. Thus, the store data to be merged is inputted to the data field 58b in the byte position indicated by the byte mask 114 of the entry indicated by the signal 103.

Further, upon merging, the input store data may be written in the same byte position as the store data existing in the following-stage store buffer 2b and to be merged, that is, the store data may be overwritten thereon, while when the store instructions for the same entry are inputted successively, the last store instruction is held in the following-stage store buffer 2b and the newest data is then outputted to the SCM. Accordingly, there is no problem.

(c) When the signal line 107="0" (unsuccessful SCM hit check), the output of the AND gate 202 of FIG. 18 is "0" so that the selector 203 selects "0" and the decoder 69 is all "0". Accordingly, the signal line 103 is all "0" and the value of the latch is not updated.

[EMBODIMENT 3]

An embodiment 3 is now described. When the width of data to be written to the SCM is widened, the efficiency of writing of data is improved. Accordingly, in the embodiment, the width of data to be written to the SCM is widened to double or 128 bits (16 bytes) and two entries of the following-stage store buffer are merged to be outputted. Whether the entries can be merged or not (that is, whether addresses of two entries are continuous or not) is confirmed by comparing upper 28 bits (0th to 27th bits) of the store addresses since the width of the write data is 16 bytes.

Figure 19:
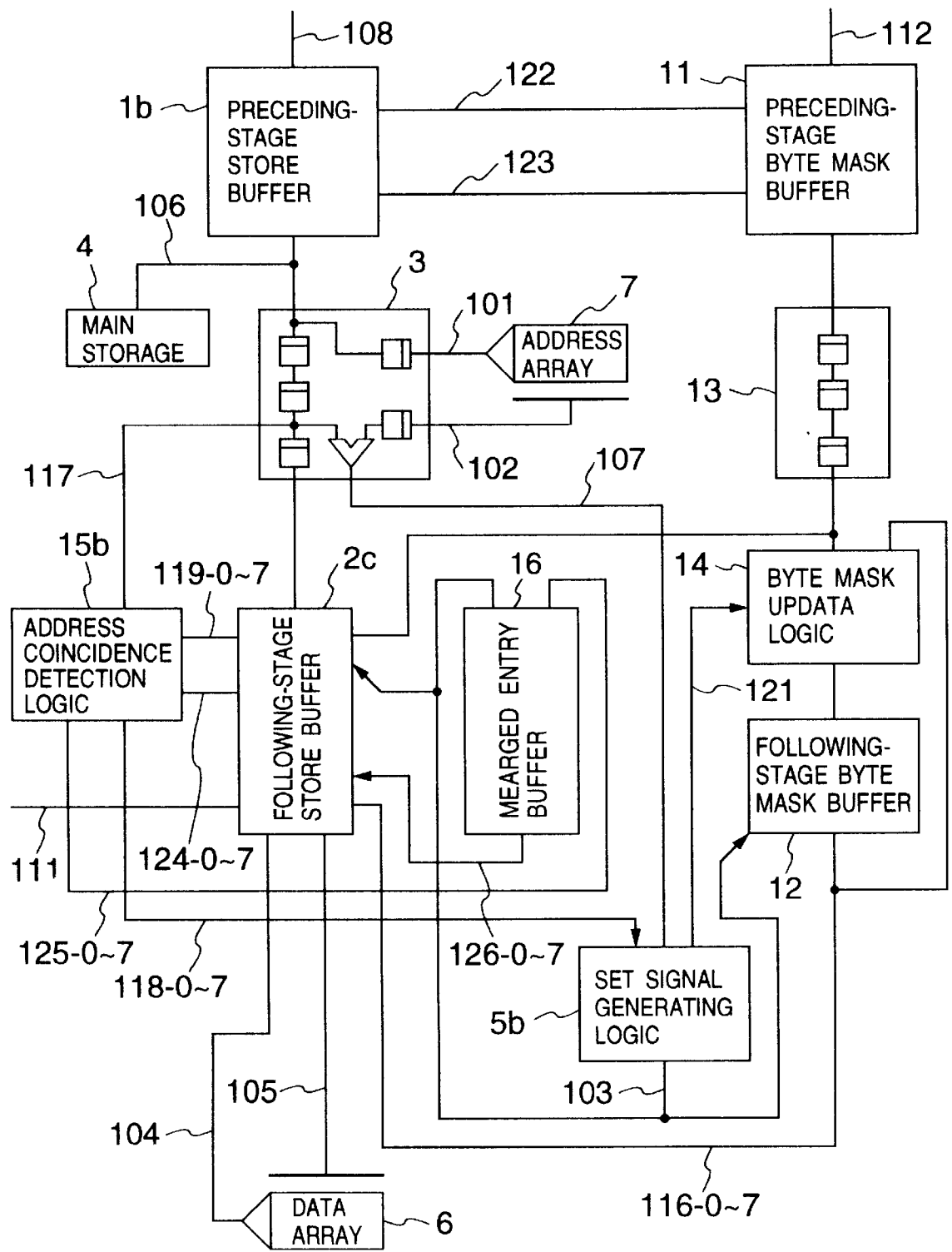
FIG. 19 is a schematic diagram illustrating an embodiment 3.

FIG. 19 is a schematic diagram illustrating an embodiment 3 of the present invention. Numeral 2c denotes the following-stage store buffer, 15b the address coincidence detection logic, and 16 a merged entry buffer. The merged entry buffer 16 indicates which two entries are merged when a plurality of entries of the following-stage store buffer 2c are merged and outputted.

The embodiment 3 is featured by a control method that two entries are merged and outputted from the following-stage store buffer 2c. There is provided the merged entry buffer 16 indicating which entry can be merged. Further, there is provided the address coincidence detection logic 15b which compares the store addresses to judge the entry which can be merged. In addition, there is provided the following-stage store buffer 2c which can output any two entries simultaneously.

Figure 20:
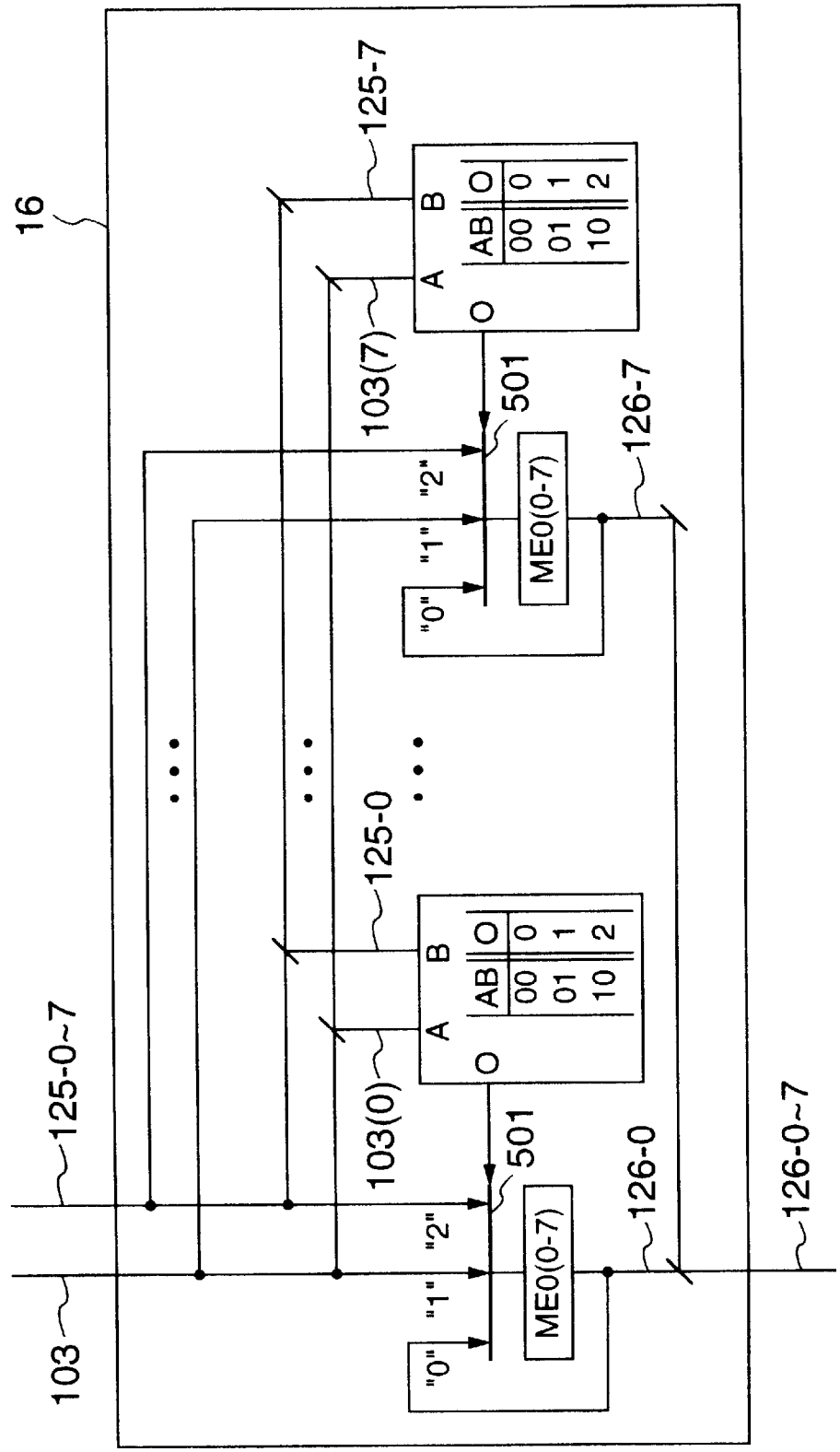
FIG. 20 is a schematic diagram illustrating a merged entry buffer.

FIG. 20 is a schematic diagram illustrating the merged entry buffer 16. The merged entry buffer 16 has the same number of entries as that of the following-stage store buffer 2c. In the embodiment, the merged entry buffer 16 includes 8 entries each of which includes a merged entry field MEn (n=0 to 7) of 8 bits.

The merged entry field MEn of 8 bits indicates an entry capable of being merged with an n-th entry. The 0th bit indicates that merging can be made with the 0th entry, . . . , the 7th bit indicates that merging can be made with the 7th entry.

For example, when the 1st and 3rd entries can be merged with each other, a value ME1="00010000" indicating that merging can be made with the 3rd entry is stored in the merged entry field ME1 and a value ME3="01000000" indicating that merging can be made with the 1st entry is stored in the coupled entry field ME3. Further, when merging cannot be made with any entry, MEn is all "0".

Numerals 125-0 to 7 denotes outputs of the address coincidence detection logic 15b, which indicates an existing entry which can be merged on the basis of comparison with an address of a store instruction from the SCM hit check logic 3. The output 125-0 indicates that merging can be made with the 0th entry, . . . , the output 125-7 indicates that merging can be made with the 7th entry.

Two tables in the buffer 16b of FIG. 20 shows a relation of inputs A (signal 103) and B (signal 125-0 to 7) and an output 0. For example, when AB="00", O=0 and when AB="01", O=1. The selectors 501 select the input "0", "1" (103) or "2" (125-0 to 7) in accordance with O=0, 1 or 2.

Numeral 103(0) represents the 0th bit of the signal line 103, . . . , 103(7) represents the 7th bit. The signal on the signal line 103 is outputted from the set signal generating logic 5b (FIG. 19) and shows an entry number of the store data inputted to the following-stage store buffer 2c. For example, when the 0th bit of the signal line 103 is "1", the input store data is inputted to the 0th entry of the data field 58b.

The value of the MEn is set in accordance with the set signal 103 and the value of the signal lines 125-0 to 7 as follows. "≠" represents the inequality.

(A) When the signal line 103=all "0" (that is, no input to the following-stage store buffer) and the signal lines 125-0 to 7=all "0", that is, AB="00" and hence O="0", MEn holds the past value.

(B) When the signal line 103≠all "0" and the signal lines 125-0 to 7=all "0" (that is, when there is an input to the following-stage store buffer and there is no coupled entry), (a) for the entry of the signal line 103(n)="1", since AB="10" and hence O=2, the selector 501 selects the value on the signal line 125-0 to 7 and accordingly MEn=all "0".

(b) for the entry of the signal line 103(n)="0" since AB="00" and hence O=0, the selector 501 selects "0" and accordingly MEn holds the past value.

(C) When the signal line 103≠all "0" and the signal lines 125-0 to 7≠all "0" (that is, when there is an input to the following-stage store buffer and there is a merged entry), (a) for the entry of the signal line 103(n)="1", since AB="10" and hence O=2, the selector 501 selects the value on the signal lines 125-0 to 7 and accordingly MEn holds the entry on the signal line 125(n), that is, the merged entry.

For example, when the signal line 103(0)="1", that is, when the 0th entry is "1", ME0 is selected and when the signal line 125-1, for example, is 1 (that is, the mergable entry is the 1st entry), ME0 is set to ME0="010000000".

(b) for the entry of the signal lien 103="0" and the signal lines 125-0 to 7="0", since AB="00" and hence O=0, the selector 501 selects "0" and MEn holds the past value.

(c) for the entry of the signal line 103="0" and the signal lines 125-0 to 7≠"0", since AB="01" and hence O=1, the selector 501 selects the set signals 103-0 to 7 and MEn holds the set signal 103-0 to 7.

In the above example of (a) in (C), since the signal line 125-1="1", ME1 of the 1st entry is selected and the set signal 103(0), that is, the 0th entry is set to ME1 and ME1="10000000".

Consequently, in the above example,
ME0="01000000" and
ME1="10000000"
are set in the merged entry buffer 16 and it is indicated that the 0th entry and the 1st entry can be merged with each other.

Figure 21:
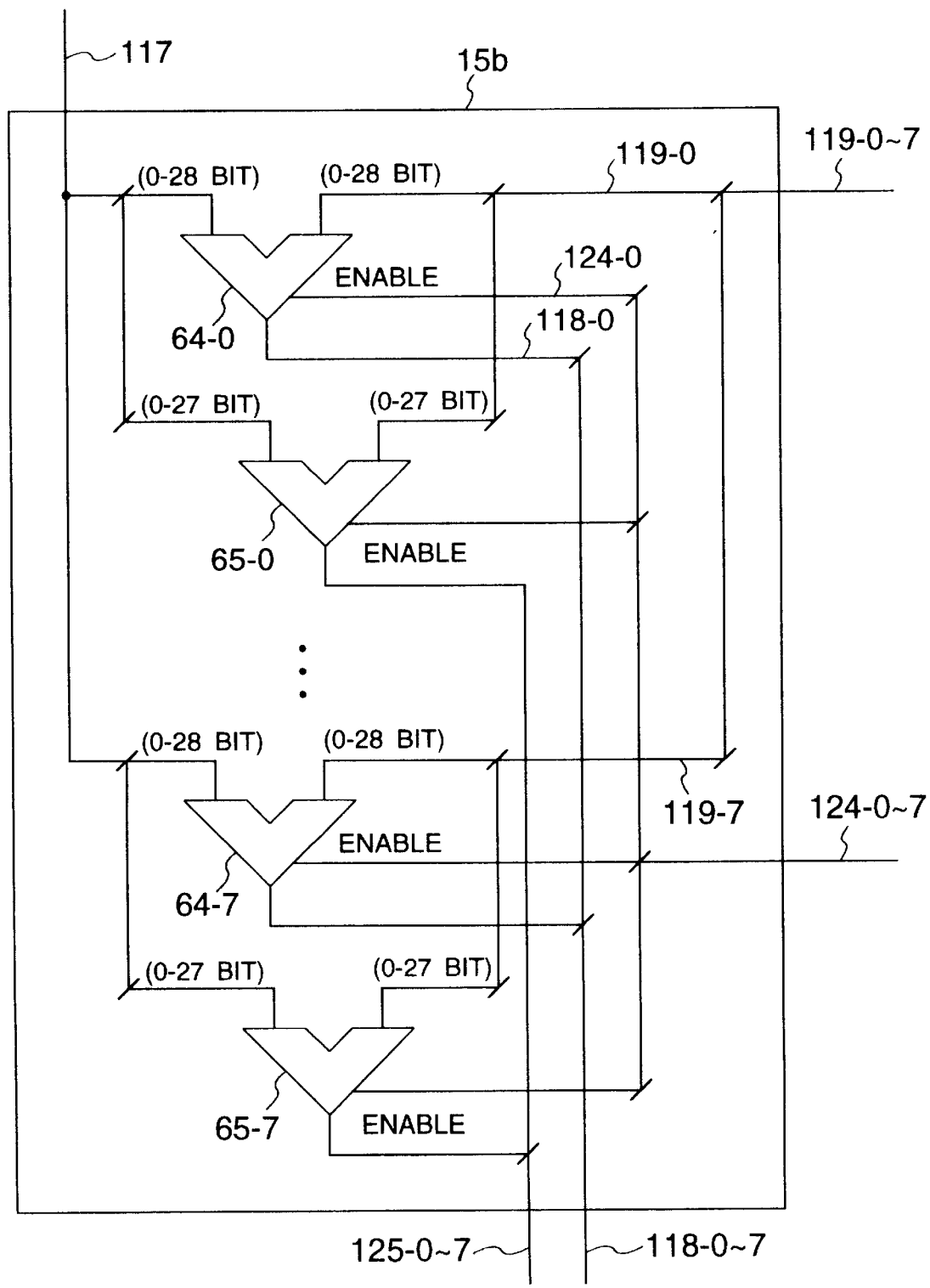
FIG. 21 is a schematic diagram illustrating an address coincidence logic of the embodiment 3.

FIG. 21 is a schematic diagram illustrating the address coincidence detection logic 15b of the embodiment 3. Whether merging of data can be made or not so that a plurality of store instructions store data in one data entry of the store buffer can be confirmed by comparing upper 29 bits of the store address with each other. Further, since the writing width of data is 128 bits (16 bytes) in the embodiment, whether merging and transfer can be made to the SCM or not can be confirmed by comparing upper 28 bits of the store address with each other.

Numerals 64-0 to 7 denotes address comparators of 29 bits for judging whether merging of data can be made or not, 65-0 to 7 address comparators of 28 bits for judging whether merging can be made or not, 117 a store address, 119-0 to 7 contents of the address field 57b, 124-0 to 7 contents of the effective bits 59, 118-0 to 7 entries having coincident addresses and data capable of being merged, and 125-0 to 7 entries having coincident addresses and data capable of being merged.

When enable signals (124-0 to 7) are "1" (effective), the address comparators 64-0 to 7 compare 0th to 28th bits of the store address 117 with the contents 119-0 to 7 of the address field 57b. When the addresses are coincident, the address comparators produce "1" to 118-0 to 7 and when the addresses are not coincident, the address comparators produce "0" to 118-0 to 7. When the enable signals are "0" (ineffective), the address comparators produce "0".

Similarly, when the enable signals (124-0 to 7) are "1" (effective), the address comparators 65-0 to 7 compare 0th to 27th bits of the store address 117 with 0th to 27th bits of the contents 119-0 to 7 of the address field 57b. When the addresses are coincident, the address comparators produce "1" to 125-0 to 7 and when the addresses are not coincident, the address comparators produce "0" to 125-0 to 7. When the enable signals are "0" (ineffective), the address comparators produces "0".

Figure 22:
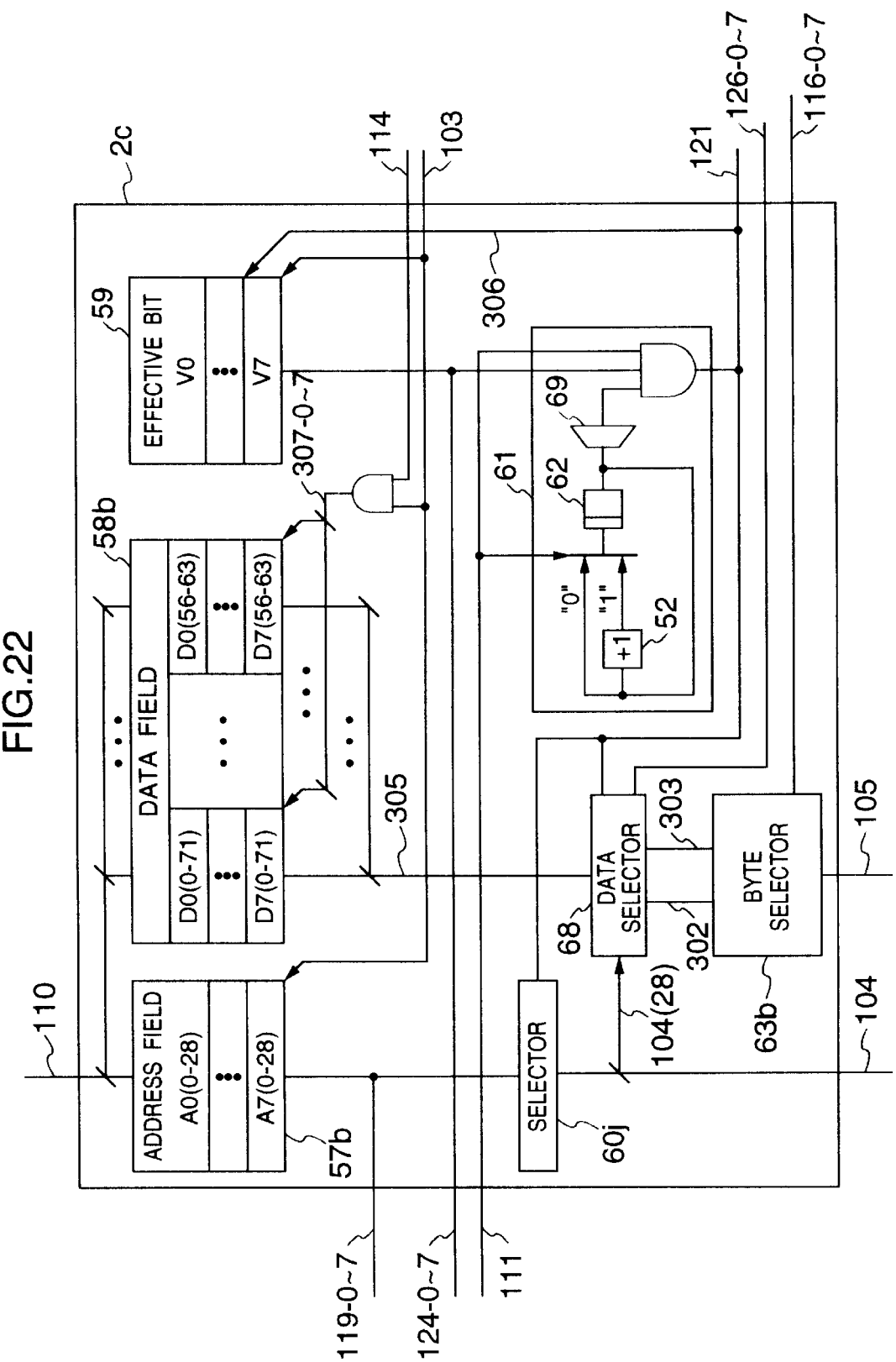
FIG. 22 is a schematic diagram illustrating a following-stage store buffer of the embodiment 3.

FIG. 22 is a schematic diagram illustrating the following-stage store buffer 2c of the embodiment 3. The store buffer 2c comprises a data selector 68 and a byte selector 63b in addition to the configuration of the embodiment 2. An input 104(28) to the data selector 68 represents the 28th bit of the signal line 104 (SCM store address).

Figure 23:
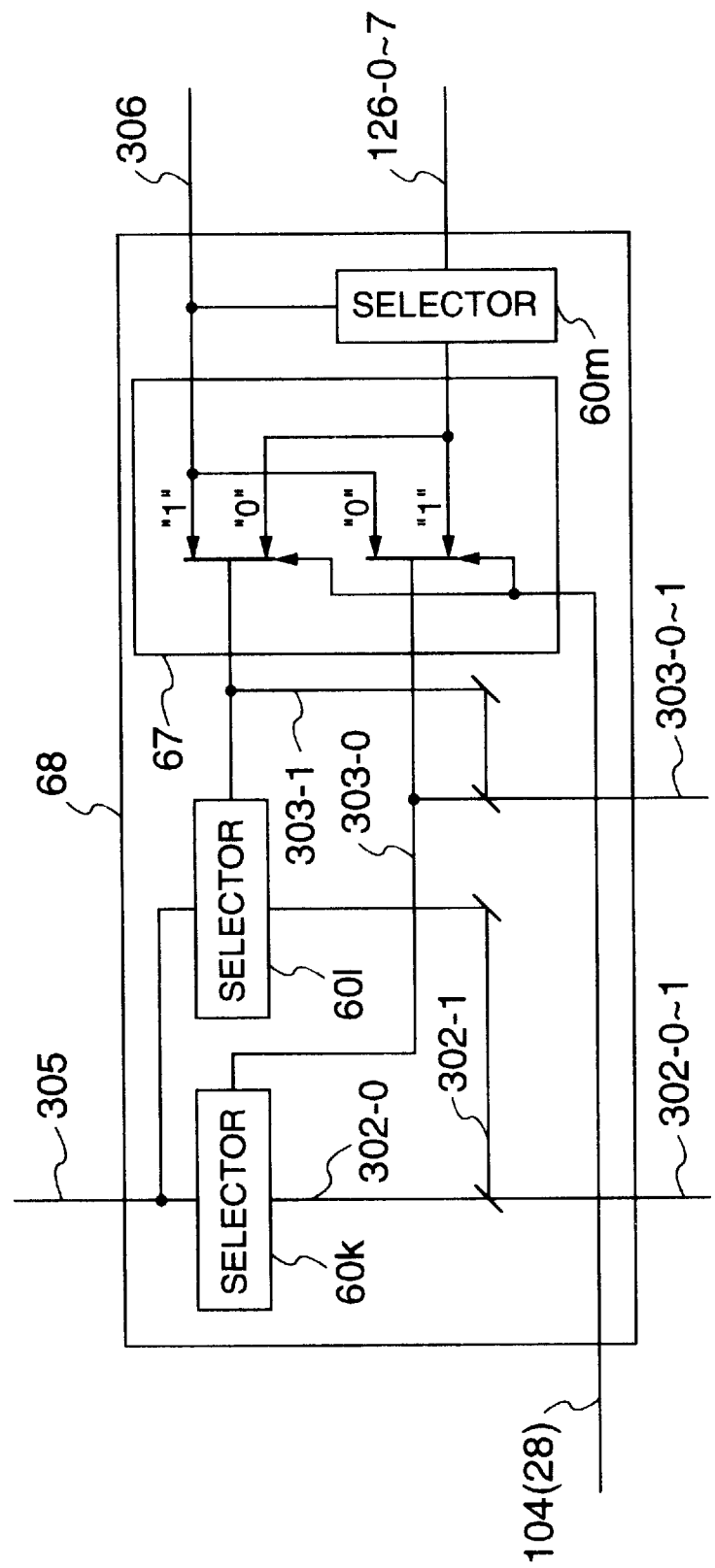
FIG. 23 is a schematic diagram illustrating a data selector.

FIG. 23 is a schematic diagram of the data selector 68. Numerals 60k and 601 denote selectors for selecting one output 305 of the data field 58b, 60m a selector for the merged entry, 67 a read pointer replacement logic, 104(28) a value ("1" or "0") of 28th bit of the store address 104, 302-0 to 1 selected store data, 303-0 to 1 read pointers in the data selector 68, 303-0 a lower read pointer, and 303-1 an upper read pointer.

The two data selectors are provided so that two entries can be outputted simultaneously. That is, the data selector 60k selects data of the lower address and the data selector 601 selects data of the upper address.

The entries produced simultaneously are the entry (decided by the output request 111) indicated by the output entry 306 and the entry capable of being merged with the entry 306. The selector 60m selects a signal line 126-0 to 7 on the basis of a value of the output entry 306 and produces the number of the entry capable of being merged with the entry 306. That is, the entry number capable of being merged with the output entry 306 is produced with reference to the merged entry field MEn having the value of the output entry 306.

In the embodiment, since the data write bus of the SCM has a width of 128 bits (16 bytes) and the data field of the following-stage store buffer 2c has a width of 64 bits (8 bytes), data is set in the upper address or the lower address of the data write bus of the SCM depending on the store address.

The store address of the entry indicated by the output entry 306 is selected by the selector 60*j* shown in FIG. 22 and is outputted to the store address 104. When a value of the signal line 104(28) of the 28th bit of the store address is "1", the data of the output entry 306 is set to the upper side. The data of the entry indicated by the merged entry (signal lines 126-0 to 7) is set to the lower side.

On the contrary, when the value of the signal line 104(28) is "0", the data of the entry indicated by the output entry 306 is set to the lower side and the data of the entry indicated by the merged entry is set to the upper side.

The read pointer replacement logic 67 produces the read pointers 303-0 to 1 in the data selector 68 on the basis of the above condition. With respect to the merged entry, as described above, the selector 60*m* selects one of the outputs 126-0 to 7 of the merged entry buffer 16 on the basis of the output entry 306. Operation of the read pointer replacement logic 67 is as follows:

(a) When the signal line 104(28)="1" (select the input 306 and the input on "1" side of 126-0 to 7), the output (merged entries 126-0 to 7) of the selector 60*m* is selected as the read pointer 303-0 to be supplied to the selector 60*k* and the output entry 306 is selected as the read pointer 303-1 to be supplied to the selector 601. Accordingly, the data 58*b* of the output entry 306 is selected by the selector 601 to be set in the upper side and the data 58*b* of the merged entry is selected as the selector 60*k* to be set in the lower side so that the data 302-0 to 1 are constituted.

(b) When the signal line 104 (28)="0" (select the input 306 and the input on "0" side of 126-0 to 7), the output entry 306 is selected as the read pointer 303-0 to be supplied to the selector 60*k* and the output (merged entry) of the selector 60*m* is selected as the read pointer 303-1 to be supplied to the selector 601. Accordingly, the data of the entry 306 is set in the lower side and the data of the merged entry is set in the upper side so that the data 302-0 to 1 are constituted.

Figure 24:
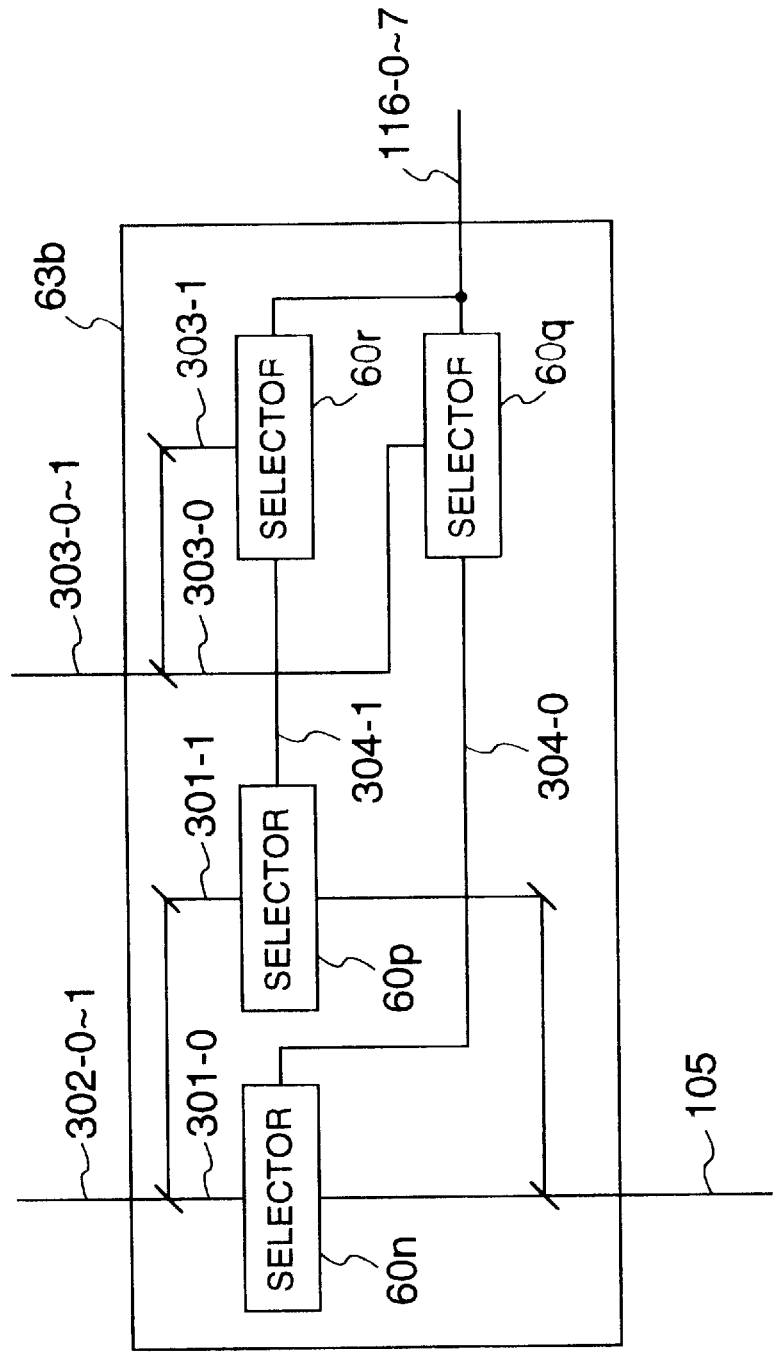
FIG. 24 is a schematic diagram illustrating a byte selector.

FIG. 24 is a schematic diagram illustrating the byte selector 63*b*. Numerals 60*r* and 60*q* denote selectors for taking out byte masks 304-0 to 1 of the output entry from the contents 116-0 to 7 of the following-stage mask buffer on the basis of the read pointers 303-0 to 1, and 60*n* and 60*p* selectors for taking out data at the effective byte position on the basis of a value of the byte masks 304-0 to 1.

For example, when the data 58*b* of the output entry 306 is on the upper side, the selector 60*r* is operated by the read pointer 303-1 to select the byte mask corresponding to the output entry 306 and outputs the byte mask to the selector 60*p*. The selector 60*p* takes out data of the effective byte position designated by the byte mask 304-1 from the data 58*b* of the output entry 306 and outputs the data as the SCM store data 105.

[EMBODIMENT 4]

An embodiment 4 is now described. In order to avoid the processing from being stopped due to unsuccessful cache hit check, a load instruction which does not read data from the cache memory but can read data from the main storage unit directly and proceed to a next processing without waiting arrival of this load data is introduced. In the embodiment, this load instruction is named a preload instruction. The preload instruction is advantageous for processing of a great number of data.

However, when there are a store instruction and a preload instruction for the same address and the preload instruction outstrips the preceding store instruction, the preload instruction reads wrong data. Thus, it is necessary to ensure the order between instructions referring to the main storage unit.

Figure 25:
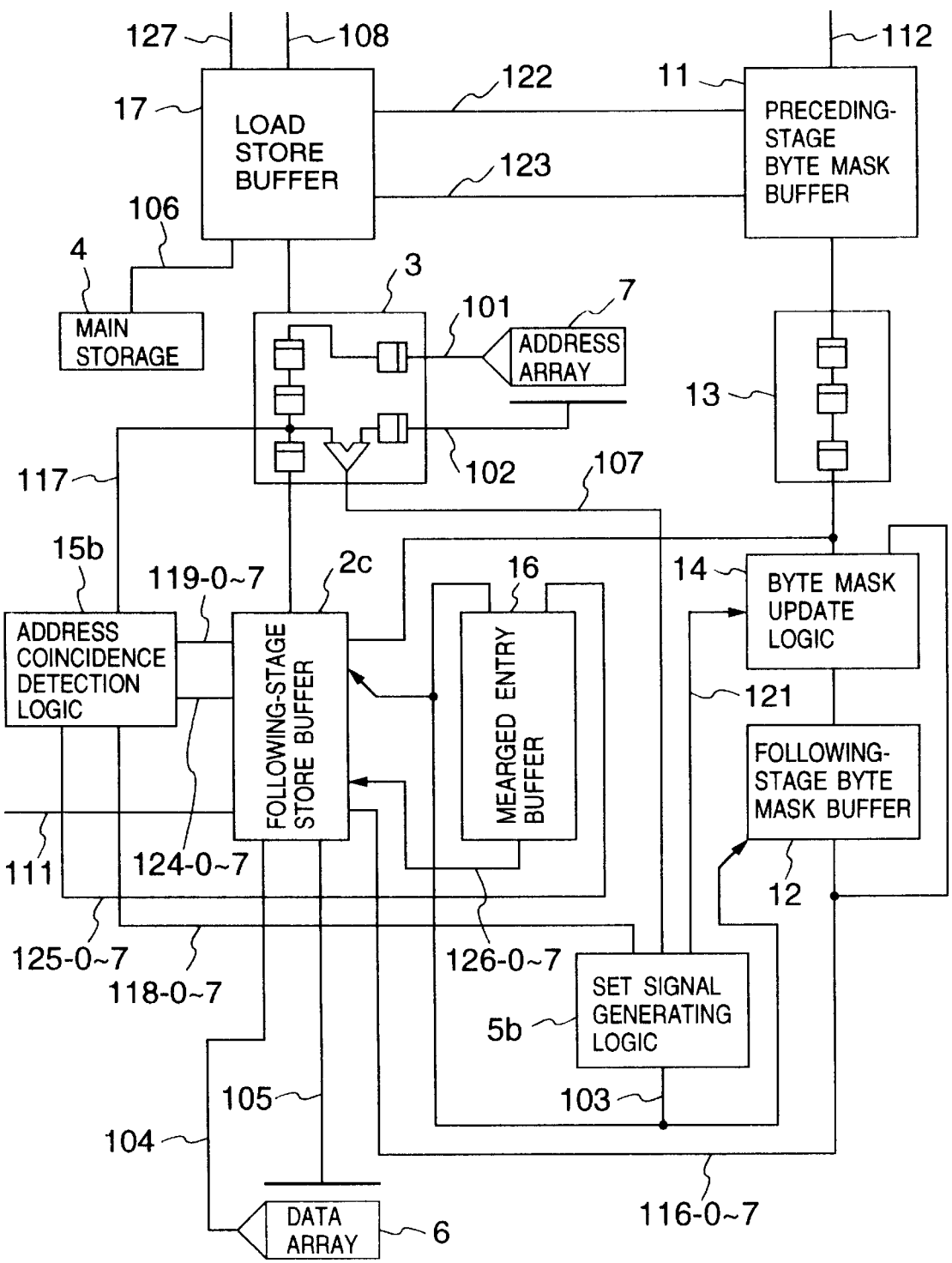
FIG. 25 is a schematic diagram illustrating an embodiment 4.

FIG. 25 is a schematic diagram illustrating the embodiment 4 of the present invention. Numeral 17 denotes a load store buffer provided in the embodiment. The load store buffer is a FIFO type buffer which holds the preload instruction and the store instruction.

Figure 26:
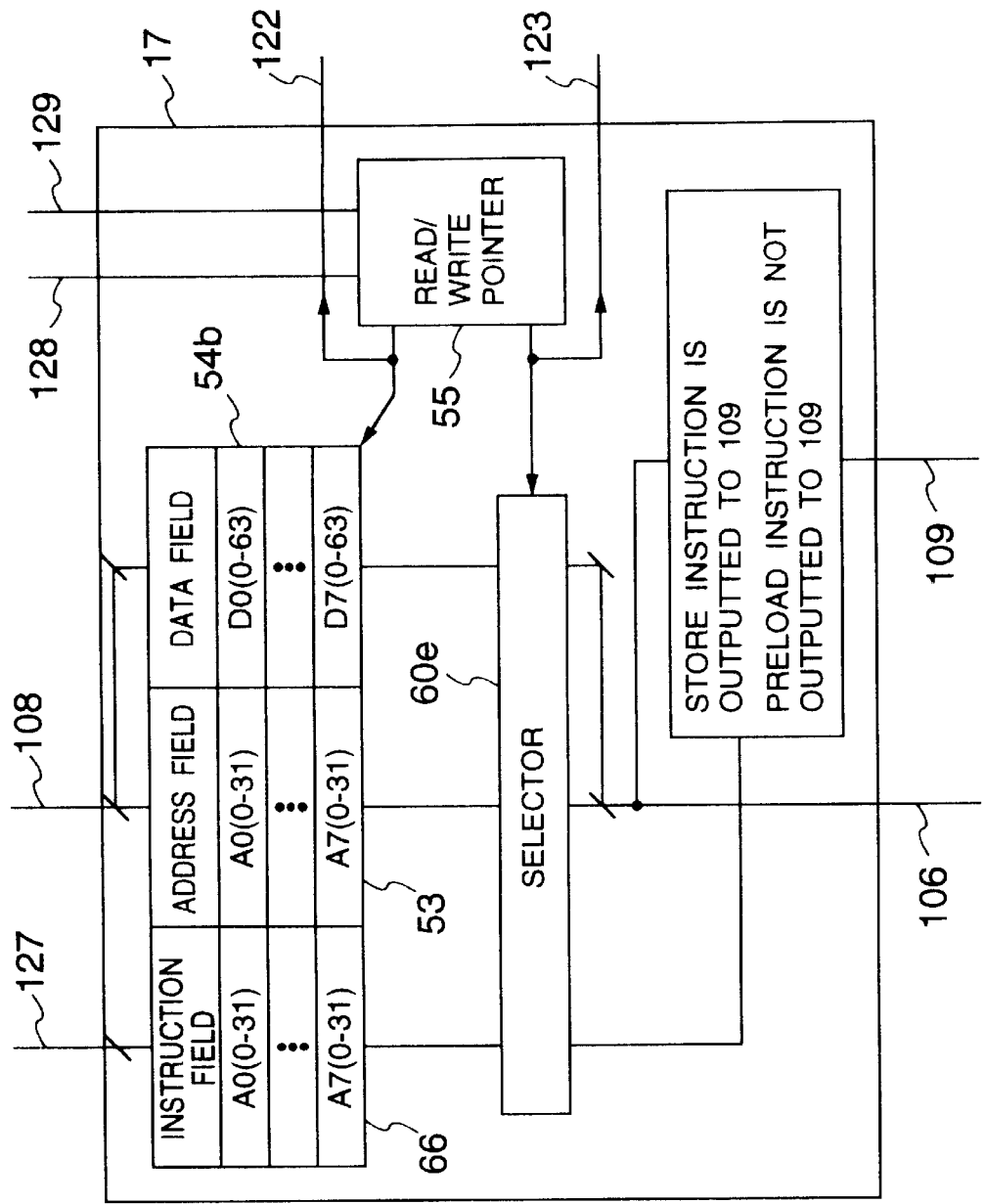
FIG. 26 is a schematic diagram illustrating a load store buffer.

FIG. 26 is a schematic diagram illustrating a load store buffer. Numeral 66 denotes an instruction field operation part. The instruction field 66 indicates whether an instruction of the entry is a preload instruction or a store instruction.

In the embodiment, the load store buffer 17 has 8 entries, each of which includes an address field of 32 bits, a data field of 64 bits and the instruction field OP. The store address and data are inputted from the signal line 108 and the instruction is inputted from the signal line 127 to be written in the entry indicated by the write entry 122. At this time, when the instruction is an preload instruction, a value of the data field thereof has no meaning. On the other hand, the output from the load store buffer selects an address, data and instruction of the entry indicated by the read entry 123 by means of the selector 60*e*.

When the selected instruction is a preload instruction, the preload instruction is not supplied to the pipe-line delay logic 3 merely by inputting the preload instruction to the main storage unit. When the selected instruction is a store instruction, the store instruction is written in the main storage unit and at the same time the store instruction is sent to the pipe-line delay logic 3 to be subjected to the SCM hit check in the same manner as the above embodiments. The condition given in the embodiments mentioned above is an example and it is not intended that the present invention described in the Claims is not limited to the example.

We claim:

1. A store buffer apparatus connected to a CPU and a main storage unit, comprising:

first buffer means for holding a pair of store address and store data in said main storage unit supplied from an operation execution unit of said CPU, said store address being output to a store address array;

at least two cascade-connected latches connected cascade to said first buffer means and through which said store address and said store data are successively transmitted;

judgment means for comparing an output read out from said address array with an output of said two latches to judge whether cache hit check for said store address is successful or not;

second buffer means connected to output of said at least two cascade-connected latches for holding the pair of store data and store address having been successful cache hit check judged by said judgment means;

a cache memory connected to output of said second buffer means for storing said store data at said store address;

means connected to said first buffer means for supplying said store address received from said first buffer means to said address array; and a latch supplied with an output read out from said address array to hold said output and for supplying said output to said judgment means.

2. A store buffer apparatus according to claim 1, further comprising:

a latch connected between said two cascade-connected latches and said second buffer means for supplying the pair of store address and store data to said second buffer means.

3. A store buffer apparatus according to claim 2, further comprising:
a successful hit check signal generating logic circuit connected to said judgment means for producing a signal which instructs said second buffer means to hold the pair of store data and store address having been successful cache hit check in response to the successful cache hit check.

4. A store buffer apparatus according to claim 1, further comprising:
a latch connected between said two cascade-connected latches and said second buffer means for supplying the pair of store address and store data to said second buffer means.

5. A store buffer apparatus according to claim 4, further comprising:
a successful cache hit check signal generating logic circuit connected to said judgment means for producing a signal which instructs said second buffer means to hold the pair of store data and store address having been successful cache hit check in response to the successful cache hit check.

6. A store buffer apparatus according to claim 1, further comprising:
a successful cache hit check signal generating logic circuit connected to said judgment means for producing a signal which instructs said second buffer means to hold the pair of store data and store address having been successful cache hit check in response to the successful cache hit check.

7. A store buffer apparatus connected to a CPU and a main storage unit, comprising:
first buffer means for holding a pair of store address and store data in said main storage unit supplied from an operation execution unit of said CPU;
a first latch connected to said first buffer means for holding an output said store address and said store data;
a second latch connected cascade to said first latch for holding an output of said first latch;
judgment means for comparing an output read out from said address array with an output of said second latch to judge whether cache hit check for said store address is successful or not;
second buffer means connected to output of said second latch for holding the pair of store data and store address having been successful cache hit check judged by said judgment means;
a cache memory connected to output of said second buffer means for storing said store data at said cache address;
means connected to said first buffer means for supplying said store address received from said first buffer means to said address array; and
a latch supplied with an output read out from said address array to hold said output and for supplying said output to said judgment means.

8. A store buffer apparatus according to claim 7, further comprising:
latch connected between said second latch and said second buffer means for supplying the pair of store address and store data to said second buffer means.

9. A store buffer apparatus according to claim 8, further comprising:
a successful cache hit check signal generating logic circuit connected to said judgment means for producing a signal which instructs said second buffer means to hold the pair of store data and store address having successful cache hit check in response to the successful cache hit check.

10. A store buffer apparatus according to claim 7, wherein while said judgment means performs cache hit check in response to the output of said second latch, said first latch holds a next store address of said store address.

11. A store buffer apparatus according to claim 7, further comprising:
an address coincidence detection circuit for detecting whether data to be stored in the same address as the data stored in said second buffer means is present or not, and
wherein said cache hit check signal generating logic circuit supplies a data holding signal to said second buffer means so that data to be stored is stored in the same address when an output of said address coincidence detection circuit indicates coincidence of the address.

12. A store buffer apparatus according to claim 11, further comprising:
a first mask buffer connected to said first buffer means for holding a first byte mask indicating a position in the address field in which effective data exists;
a plurality of cascade-connected latches connected to said mask buffer for holding said byte mask by a time corresponding to a time that said judgment means performs cache hit check in response to the output of said second latch; and
a second mask buffer connected to said cache hit check signal generating logic circuit and including a second byte mask for indicating that the data stored in said second buffer means has a format into which two data are merged on the basis of an output of said first mask buffer.

13. A store buffer apparatus according to claim 12, further comprising:
a merged entry buffer connected to said second buffer for holding a merged entry indicating whether first data can be merged with second data or not when data produced by said second buffer means has an expanded data width, and
output means for outputting merged data to a cache memory on the basis of the merged entry.

14. A store buffer apparatus according to claim 13, wherein when an instruction is a store instruction for writing data in said main storage unit, said first buffer means sends a pair of store address and store data to said first latch and when an instruction is a preload instruction for taking out data from said main storage unit, said first buffer means sends said preload instruction to said main storage unit.

15. A store buffer apparatus comprising:
first buffer means including a plurality of entries for temporarily holding pairs of store address and store data produced from an operation execution unit and written in a main storage unit and a cache memory;
at least two cascade-connected latches connected cascade to said first buffer means for successively transmitting said store address and said store data;
judgment means connected to output of said at least two cascade-connected latches and supplied with the pair of store address and store data taken out through said at least two cascade-connected latches from said first buffer means for performing cache hit check with said cache memory in pipe-line manner;

second buffer means connected to output of said judgment means and including a plurality of entries for temporarily holding pairs of store data and store address judged as the cache hit check;

a cache memory connected to output of said second buffer means for storing said store data at said store address;

means for storing information indicating an effective data position in entries of said first and second buffer means to hold store data having a data length that does not use all of one entry of said first and second buffer means;

means for judging whether first store data inputted to said second buffer means can be merged in the same entry with second store data already existing in said second buffer means;

means for merging said first store data with said second store data to write the merged store data into said same entry when said judging means judges that said store data can be merged with each other; and means for updating said stored information indicating the effective data position in the entry of said second buffer means in response to said writing.

16. A store buffer apparatus according to claim 15, comprising:

means for judging whether first store data inputted to said second buffer means is merged with second store data already existing in said second buffer;

means for storing entry numbers of said store data to be merged when said judging means judges that said store data can be merged with each other; and means for merging store data of a plurality of entries in said second buffer means to supply the merged data to said cache memory on the basis of said stored entry numbers.

17. A store buffer apparatus connected to a CPU and a main storage unit, comprising:

first buffer means for holding a pair of store address and store data in said main storage unit supplied from an operation execution unit of said CPU;

a first latch connected to said first buffer means for holding an output said store address;

a second latch connected to said first latch for holding an output of said first latch;

judgment means for comparing an output read out from said address array with an output of said second latch to judging whether cache hit check for said store address is successful or not;

second buffer means for holding the pair of store data and store address having successful cache hit check judged by said judgment means;

an address coincidence detection circuit for detecting whether data to be stored in the same address as the data stored in said second buffer means is present or not;

a first mask buffer connected to said first buffer means for holding a first byte mask indicating a position in the address field in which effective data exists;

a plurality of cascade-connected latched connected to said mask buffer for holding said byte mask by a time corresponding to a time that said judgment means performs cache hit check in response to the output of said second latch; and a second mask buffer connected to said cache hit check signal generating logic circuit and including a second byte mask for indicating that the data stored in said second buffer means has a format into which two data are merged on the basis of an output of said first mask buffer, wherein said cache hit check signal generating logic circuit supplies a data holding signal to said second buffer means so that data to be stored is stored in the same address when an output of said address coincidence detection circuit indicates coincidence of the address.

18. A store buffer apparatus according to claim 17, further comprising:

a merged entry buffer connected to said second buffer for holding a merged entry indicating whether first data can be merged with second data or not when data produced by said second buffer means has an expanded data width, and output means for outputting merged data to a cache memory on the basis of the merged entry.

19. A store buffer apparatus according to claim 18, wherein when an instruction is a store instruction for writing data in said main storage unit, said first buffer means sends a pair of store address and store data to said first latch and when an instruction is a preload instruction for taking out data from said main storage unit, said first buffer means sends said preload instruction to said main storage unit.

* * * * *